United States Patent
Frink et al.

(10) Patent No.: US 11,868,301 B1
(45) Date of Patent: Jan. 9, 2024

(54) SYMMETRICAL MULTI-PROCESSOR SERIAL LINKS

(71) Applicant: Amazon Technologies, Inc., Seattle, WA (US)

(72) Inventors: Darin Lee Frink, Lake Tapps, WA (US); Michael Jon Moen, Olympia, WA (US); Christopher Nathan Watson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1263 days.

(21) Appl. No.: 14/668,795

(22) Filed: Mar. 25, 2015

(51) Int. Cl.
*G06F 13/16* (2006.01)
*G06F 12/06* (2006.01)
*G06F 12/0866* (2016.01)
*G06F 13/42* (2006.01)
*G06F 13/40* (2006.01)
*G06F 13/10* (2006.01)

(52) U.S. Cl.
CPC ........ *G06F 13/4221* (2013.01); *G06F 13/105* (2013.01); *G06F 13/4068* (2013.01); *G06F 13/4282* (2013.01)

(58) Field of Classification Search
CPC ............... G06F 13/105; G06F 13/4068; G06F 13/4221; G06F 13/4282
USPC ......................................................... 710/301
See application file for complete search history.

(56) References Cited

U.S. PATENT DOCUMENTS 8,812,762 B2 * 8/2014 Brandyberry ............. G06F 1/20
710/301
2003/0023801 A1 * 1/2003 Erickson ............... G06F 13/387
710/301
2008/0201515 A1 * 8/2008 Birgin ................... G06F 13/409
710/313
2011/0304966 A1 * 12/2011 Schrempp ............... G06F 1/189
361/679.4
2012/0144087 A1 * 6/2012 Buckland ............ G06F 13/4068
710/316

(Continued)

OTHER PUBLICATIONS

Mellanox Technologies, "Mellanox Announces Multi-Host Technology, Enabling Next Generation Compute and StorageRack Design for Scalable Clouds and Data Centers," Mar. 10, 2015 Press Release, pp. 1-2.

(Continued)

*Primary Examiner* — Idriss N Alrobaye
*Assistant Examiner* — Brooke J Taylor
(74) *Attorney, Agent, or Firm* — Robert C. Kowert; Kowert, Hood, Munyon, Rankin & Goetzel, P.C.

(57) ABSTRACT

A computer system includes symmetrical sets of motherboard serial channels which couple processor devices on a motherboard with a common serial link interface. The common serial link interface can be coupled with an endpoint device to establish symmetrical serial links between the endpoint device and the processor devices. The computer system can include a riser card which can be coupled with the serial link interface. The riser card can include an endpoint device interface and serial channels which can couple the processor devices with the endpoint device via symmetrical limited selections of the motherboard serial channels. The riser can include additional interfaces which can couple the processor devices with additional expansion devices.

20 Claims, 12 Drawing Sheets

(56) References Cited

U.S. PATENT DOCUMENTS

| | | | | |
|---|---|---|---|---|
| 2013/0038999 | A1* | 2/2013 | Tian | G06F 3/0658 |
| | | | | 361/679.41 |
| 2013/0141863 | A1* | 6/2013 | Ross | H05K 7/1488 |
| | | | | 361/679.33 |
| 2013/0332640 | A1* | 12/2013 | Nasu | G06F 13/409 |
| | | | | 710/301 |
| 2014/0129753 | A1* | 5/2014 | Schuette | G06F 13/4068 |
| | | | | 710/301 |
| 2016/0147699 | A1* | 5/2016 | Hartman | G06F 13/4221 |
| | | | | 710/302 |
| 2016/0179727 | A1* | 6/2016 | Hartman | G06F 13/4221 |
| | | | | 710/313 |
| 2016/0188513 | A1* | 6/2016 | Nair | G06F 13/366 |
| | | | | 710/113 |

OTHER PUBLICATIONS

Mellanox Technologies, "Mellanox Technologies Blog," downloaded from http://www.mellanox.com/blog/ on Mar. 19, 2015, pp. 1-11.

Mellanox Technologies, "ConnectX®-4 Single/Dual-Port Adapter supporting 100Gb/s with VPI," downloaded from http://www.mellanox.com/page/products_dyn?product_family=201&mtag=connectx_4_vpi_card[ on Mar. 19, 2015, pp. 1-2.

Ramnath Sagar, Mellanox Technologies, "Cutting Edge Innovation in Hyperscale Architecture at Open Compute Project Summit #OCPSummit15," downloaded from http://www.mellanox.com/blog/2015/03/cutting-edge-innovation-in-hyperscale-architecture-at-open-compute-project-summit-ocpsummit15/ on Mar. 19, 2015, pp. 1-5.

\* cited by examiner

SYMMETRICAL MULTI-PROCESSOR SERIAL LINKS

BACKGROUND

Many companies and other organizations operate computer networks that interconnect numerous computer systems to support their operations, such as with the computer systems being co-located (e.g., as part of a local network) or instead located in multiple distinct geographical locations (e.g., connected via one or more private or public intermediate networks). For example, data centers housing significant numbers of interconnected computer systems have become commonplace, such as private data centers that are operated by and on behalf of a single organization, and public data centers that are operated by entities as businesses to provide computing resources to customers or clients. Some public data center operators provide network access, power, and secure installation facilities for hardware owned by various clients, while other public data center operators provide "full service" facilities that also include hardware resources made available for use by their clients. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many clients with diverse needs, allowing various computing resources to be efficiently and securely shared by multiple clients. For example, virtualization technologies may allow a single physical computing machine to be shared among multiple users by providing each user with one or more virtual machines hosted by the single physical computing machine, with each such virtual machine being a software simulation acting as a distinct logical computer system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computer systems. With virtualization, the single physical computing device can create, maintain or delete virtual machines in a dynamic manner. In turn, users can request computer resources from a data center and be provided with varying numbers of virtual machine resources on an "as needed" basis or at least on an "as requested" basis.

Today, a common way to implement virtualization for peripheral devices is to run a process in a virtual machine (or hypervisor) on the main server cores of the system on which other virtual machines are running on behalf of guests. The process traps all of the accesses to the virtual hardware for the peripheral devices and then emulates those devices in software. In some cases, with this approach, the software that is responsible for emulating the peripheral devices can sometimes cause jitter and variability in performance for the guests that are running on the same machine. In addition, for an infrastructure provider that implements this approach, the processing capacity of the processor cores that are running the emulation software is not available for sale or lease to customers.

Many peripheral devices are compliant to the PCI Express (Peripheral Component Interconnect Express) bus standard. PCI Express (also referred to as PCIe) is a high-speed serial computer expansion bus standard, some versions of which support hardware I/O virtualization. In general, a PCIe bus supports full-duplex communication between any two endpoints, with data encapsulated in packets. Traditionally a PCIe endpoint presents a single PCIe interface to the host. Typically, when the PCIe endpoint is connected to a multi-socket host server, it is physically connected to only one of the processor sockets (e.g., through one PCIe expansion slot). In this case, the socket that is not directly connected to the PCIe endpoint must relay PCIe traffic to the PCIe endpoint through the socket that is directly connected to the PCIe endpoint socket. This can increase latency and jitter (e.g., non-determinism of latency) due to the dynamic queuing effects of various links and buffers in the relay path.

Figure 1:
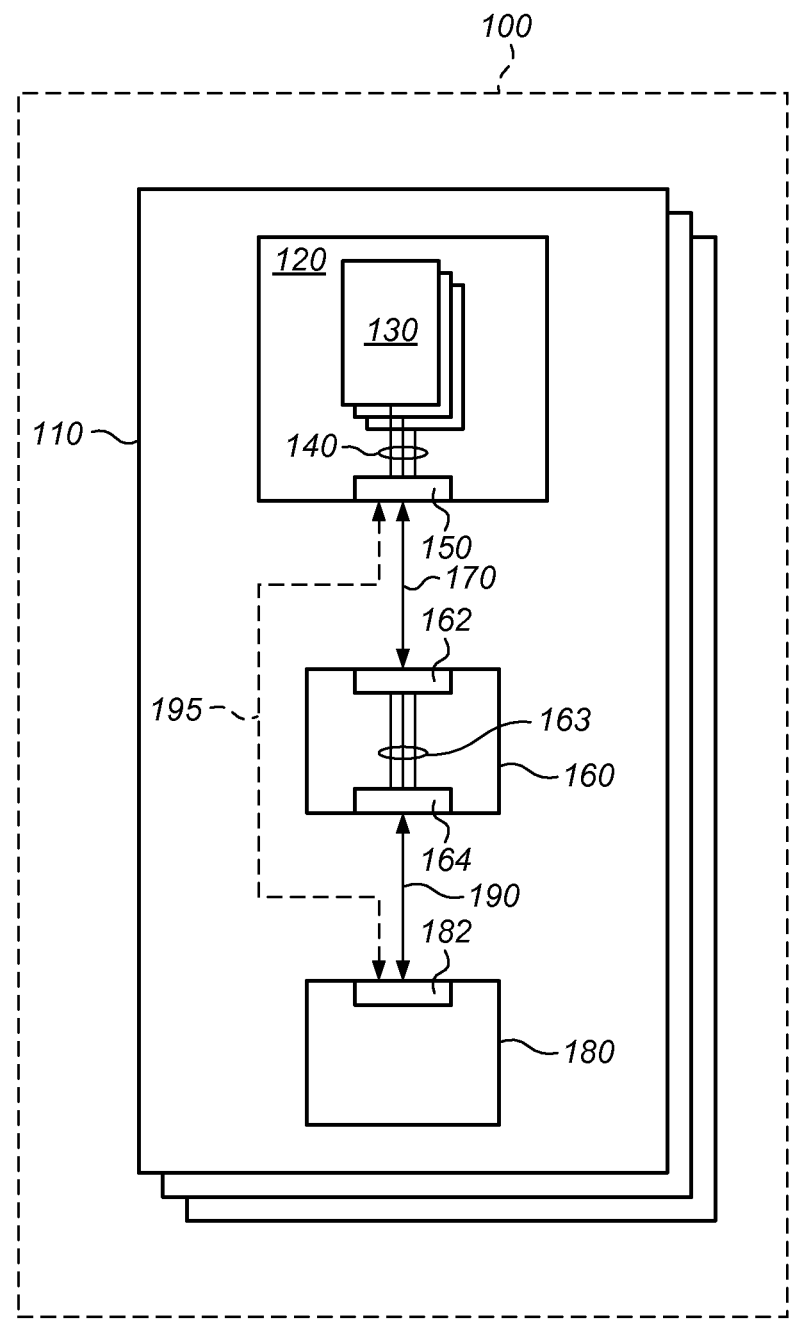
FIG. 1 is a block diagram schematic illustrating a computer system which includes multiple processor devices linked to a common endpoint device via symmetrical serial links, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

A computer system that provides virtualized computing resources can include multiple processors, also referred to herein as "processor devices", which are communicatively coupled, via separate symmetrical serial interconnects, also referred to as serial links, to a common endpoint device via an individual serial link interface.

According to some embodiments, a computer system includes a motherboard and an expansion device which is coupled to the motherboard. The motherboard includes multiple processor devices coupled to separate serial links, a serial link interface, and multiple symmetrical sets of serial channels which link the separate serial links to the serial link interface, thus communicatively coupling the multiple processor devices to the serial link interface via the symmetrical sets of serial channels. The expansion device, which can include an expansion card, includes an expansion serial link interface which couples with the motherboard serial link interface, so that the expansion serial link interface communicatively couples with symmetrical limited selections of motherboard serial channels, and an endpoint device expansion slot which can physically couple with the endpoint device. The expansion card further includes a set of symmetrical expansion serial channels which communicatively and symmetrically couple the symmetrical limited selections of motherboard serial lanes with the endpoint device expansion slot, so that the endpoint device expansion slot is configured to communicatively and symmetrically couple the endpoint device with each of the processor devices via the symmetrical limited selections of motherboard serial lanes and the set of symmetrical expansion card serial lanes. The expansion card establishes symmetrical serial links between each processor device and an endpoint device, such that the expansion card enables simultaneous communication between the endpoint device and the processor devices.

According to some embodiments, an apparatus includes a motherboard which establishes symmetrical serial links between a plurality of processor devices and an endpoint device. The motherboard includes multiple serial links which can couple with separate processor devices, and an individual motherboard serial link interface which is communicatively coupled to the serial links via separate symmetrical sets of motherboard serial channels. The motherboard serial link interface can communicatively couple with at least one serial link interface of the endpoint device, such that symmetrical serial links are established between the endpoint device and the processor devices coupled to the serial links of the motherboard.

According to some embodiments, a method includes configuring a computer system to enable simultaneous communication between a plurality of processor devices and an endpoint device via symmetrical communication pathways. Such configuring includes coupling processor devices to a plurality of serial links on a motherboard, wherein the motherboard includes an individual motherboard serial link interface and a plurality of symmetrical sets of motherboard serial channels coupling at least a portion of the motherboard serial link interface to each of the serial links, such that the coupled processor devices are communicatively coupled to the motherboard serial link interface via the symmetrical sets of motherboard serial channels, and communicatively coupling the endpoint device to the motherboard serial link interface, such that a serial link is established between the processor devices and the endpoint device via at least the motherboard serial link interface and separate symmetrical sets of motherboard serial channels.

The techniques described herein may be implemented without requiring compliance with the PCIe Multi-Root I/O Virtualization (MR-IOV) specification, which has not achieved industry acceptance.

In some embodiments, a computer system, which can be mounted in one or more rack computer systems, includes one or more motherboards which are configured to at least partially establish symmetrical serial links between multiple instances of processing circuitry, also referred to herein as processor devices, and an endpoint device, also referred to herein as an add-on device, expansion device, etc., such that the motherboard enables simultaneous and symmetrical communication between the endpoint device and multiple processor devices. In some embodiments, the endpoint device includes one or more instances of controller circuitry which are configured to control one or more processor devices, and an endpoint device which is coupled to multiple processor devices via symmetrical serial links can control the multiple processor devices simultaneously, via the symmetrical serial links. Such simultaneous communication and control of multiple processor devices by an individual endpoint device can enable the endpoint device to emulate one or more instances of computer hardware with reduced latency than if an individual processor device is controlled to emulate the one or more instances of computer processor.

In some embodiments, the motherboard is configured to establish the symmetrical serial links between an endpoint device and multiple processor devices coupled to the motherboard via communicatively coupling the endpoint device to an individual serial link interface of the motherboard. The motherboard can include multiple sets of serial channels which couple processor devices to the individual serial link interface, such that separate sets of serial channels are symmetrical and couple separate processor devices to the serial link interface, so that an endpoint device which is coupled to the serial link interface can be symmetrically communicatively coupled with the multiple processor devices via the multiple symmetrical sets of serial channels. The separate sets of serial channels can be coupled to different portions of the serial link interface, and the endpoint device can include an interface which can be communicatively coupled to at least some of each portion of the serial link interface, such that the endpoint device is communicatively coupled to the multiple processor devices via at least some serial channels in each of the separate sets of serial channels coupled to the separate portions of the serial link interface.

In some embodiments, the serial link interface of the motherboard can be physically coupled with an interface of the endpoint device to communicatively couple the endpoint device to the multiple processor devices. In some embodiments, the serial link interface of the motherboard can be coupled with one or more expansion cards, also referred to herein as riser cards, which can include one or more endpoint device interfaces configured to physically couple with the endpoint devices and a set of symmetrical serial channels which can link with at least some of the serial channels in each set of serial channels on the motherboard when the expansion card is coupled with the motherboard serial link interface. As a result, when the expansion card is coupled with the serial link interface of the motherboard, an endpoint device interface of the expansion card can be communicatively coupled with each of the processor devices coupled to the motherboard via at least some of the serial channels which link the processors to at least the motherboard serial link interface.

In some embodiments, the expansion card includes multiple device interfaces and multiple sets of serial channels which can link separate selections of motherboard serial channels to separate device interfaces on the expansion card, so that the expansion card can communicatively link the multiple processors coupled to a motherboard to various devices coupled to one or more of the device interfaces on the expansion card. Such various devices can include, in addition to the endpoint device, one or more expansion devices which can include one or more removable solid state data storage devices ("SSDs"), graphics cards, video cards, network communication cards, some combination thereof, etc. As a result, multiple expansion devices can be communicatively coupled to the processors coupled to a motherboard via a common serial link interface on the motherboard.

In some embodiments, linking multiple processors on a motherboard to one or more devices via an individual serial link interface on the motherboard results in conservation of the surface area of the motherboard, also referred to as motherboard "real estate", associated with connecting the devices with the multiple processor devices. In some embodiments, the real estate occupied by an individual serial interface, which can include one or more of a serial edge connector, serial connection slot, etc., which is configured to communicatively couple multiple sets of serial channels which are linked to multiple processor devices is less than the total real estate which is occupied on a corresponding motherboard by multiple separate serial link interfaces which are each configured to communicatively couple with separate sets of serial channels linked to separate corresponding processor devices. Thus, the motherboard which includes the individual serial link interface can occupy a smaller amount of space while providing the same capacity as a motherboard which includes multiple separate serial link interfaces. As a result, a computer system which includes motherboards where multiple processor devices coupled thereon are linked to one or more devices via an individual serial link interface on the motherboard can be smaller, and thus provide a higher density of computing capacity, than computer systems which include motherboards where multiple processor devices coupled thereon are linked to one or more devices via multiple separate serial link interfaces on the motherboard.

In some embodiments, a computer system can include multiple motherboards which each include multiple serial links configured to be coupled to separate sets of processor devices and which each further include separate individual motherboard serial link interfaces which are each communicatively coupled to the respective plurality of serial links included on the respective motherboard via multiple separate and symmetrical sets of serial channels. The serial link interfaces on the multiple separate motherboards can be coupled to various expansion cards, devices, etc. In some embodiments, separate serial link interfaces on separate motherboards can be coupled to different devices, expansion cards, etc. For example, where a computer system includes two motherboards which each include two processors and an individual serial link interface coupled to the respective two processors on the motherboard via symmetrical serial channels, one motherboard serial link interface on one motherboard can be coupled to an expansion card which includes an endpoint device interface and an expansion device interface configured to couple to a solid state data storage device, while another motherboard serial link interface on the other motherboard can be coupled to an expansion card which includes an endpoint device interface and an expansion device interface configured to couple to a networking device. As a result, a motherboard can be configured to provide various computing functions based at least in part upon coupling serial link interfaces of various different expansion cards, which each include different device interfaces and serial channels linking such interfaces with a serial link interface thereof, so that different sets of devices can be communicatively coupled to the processor devices coupled to the motherboard. Where multiple motherboards are included in a computer system, different motherboards can be coupled to different expansion cards and thus different sets of expansion devices. As a result, a base computer system which includes one or more motherboards can be configured to provide different functionality based on coupling different expansion cards to the one or more motherboards.

In some embodiments, one or more of the processor devices coupled to the motherboard include one or more processor devices which are at least partially de-featured, wherein at least some of the signal channels of the one or more processor devices are restricted from permitting communication therethrough. As a result, a de-featured processor device can include a set of signal channels and can be structurally restricted to utilizing a limited selection of the signal channels included in the processor device. For example, a de-featured processor device can include 40 signal channels, where all but 16 of the channels are structurally restricted, so that only the remaining 16 channels can be used by the processor device for communication with one or more external devices, via one or more communication channels. Structurally restricting a signal channel can include physically obstructing the signal channel.

FIG. 1 is a block diagram schematic illustrating a computer system which includes multiple processor devices linked to a common endpoint device via symmetrical serial links, according to some embodiments.

Computer system 100 includes one or more computing sets 110 of devices. Each set 110 includes a motherboard and one or more of an endpoint device 180 and an expansion card 160. Each motherboard includes multiple instances of processing circuitry 130, also referred to herein as processor devices 130, an individual serial link interface 150, and multiple separate sets of serial channels 140 which link the processor devices 130 to the individual interface 150. In some embodiments, each separate set of serial channels 140 is symmetrical with respect to the other sets of serial channels 140. Each set of serial channels can include one or more serial channels, including one or more serial point-to-point communication links, signal paths, etc. As referred to herein, symmetrical serial channels enable simultaneous communication with separate processor devices via separate serial channels of the symmetrical serial channels. Each separate processor device 130 can be coupled to separate serial communication sockets, also referred to herein as separate serial links. Each serial link can be communicatively coupled to at least a portion of the serial link interface 150 via a separate set of serial channels 140.

In some embodiments, an expansion card, which can include a daughterboard, is coupled to the serial link interface of the motherboard, where the expansion card includes at least one device interface configured to couple with one or more devices, so that the processor devices on the motherboard are configured to be communicatively coupled, via symmetrical serial links, with one or more devices coupled to one or more of the device interfaces on the expansion card. The expansion card can include one or more serial link interfaces which can couple with one or more portions of the motherboard serial link interface. The expansion card can include one or more sets of symmetrical serial channels which communicatively couple one or more device interfaces on the expansion card with one or more portions of the one or more serial link interfaces of the expansion card, so that the serial channels on the expansion card are configured to communicatively couple one or more device interfaces with one or more processor devices on the motherboard, based at least in part upon the expansion card serial link interface being coupled with the motherboard serial link interface, so that one or more sets of serial channels on the expansion card are coupled to at least some of the serial channels on the motherboard which communicatively couple the processor devices to the motherboard serial link interface.

In the illustrated embodiment of FIG. 1, set 110 includes an expansion card 160 which includes a serial link interface 162, device interface 164, and a set of serial channels 163 which communicatively couple the interfaces 162, 164. The serial link interface 162 can couple 170 with one or more portions of the motherboard serial link interface 150, thereby coupling the expansion card serial channels 163 with at least some of the serial channels 140 which communicatively couple the processor devices 130 with the interface 150. In some embodiments, the interface 162 is configured to communicatively couple with a limited selection of serial channels included in each of the symmetrical sets 140 of serial channels, where the limited selections of serial channels are symmetrical, so that the one or more sets 163 of symmetrical expansion card serial channels are communicatively coupled to the symmetrical limited selections of serial channels 140, thereby establishing symmetrical serial links between the processor devices and the device interface 164 via limited selections of serial channels in the sets 140, the coupled interfaces 150, 162, and the set of symmetrical serial channels 163.

As shown, set 110 includes an endpoint device 180 which includes an interface 182 which is configured to couple 190 with the device interface 164 of the expansion card 160. The interfaces 182, 164 can include one or more serial link interfaces, including one or more serial edge connectors, serial connection slots, etc. Coupling endpoint device 180 with interface 164 on the expansion card 160, where the expansion card is coupled to the motherboard 120 via coupling of interfaces 150, 162, can communicatively couple each of the processor devices 130 with the endpoint devices via symmetrical serial links.

In some embodiments, the motherboard serial link interface 150 can be physically coupled 195 with one or more interfaces 182 of the endpoint device 180. As a result, in some embodiments, expansion card 160 can be absent. In some embodiments, separate sets 110 include different expansion cards 160, coupled to separate motherboards, which include different quantities, arrangements, and types of devices interfaces, such that processor devices 130 in separate sets 110 are configured to be communicatively coupled, via one or more various serial links, with different sets of devices via an expansion card coupled to the respective motherboard 120 which includes the respective processor devices 130.

In some embodiments, the motherboard 120 includes an individual processor device 130 communicatively coupled, via one or more sets of one or more various serial links, with the individual serial link interface 150. In some embodiments, the motherboard 120 includes multiple processor devices 130 communicatively coupled, via separate sets of one or more various serial links, with the individual serial link interface 150.

Figure 2:
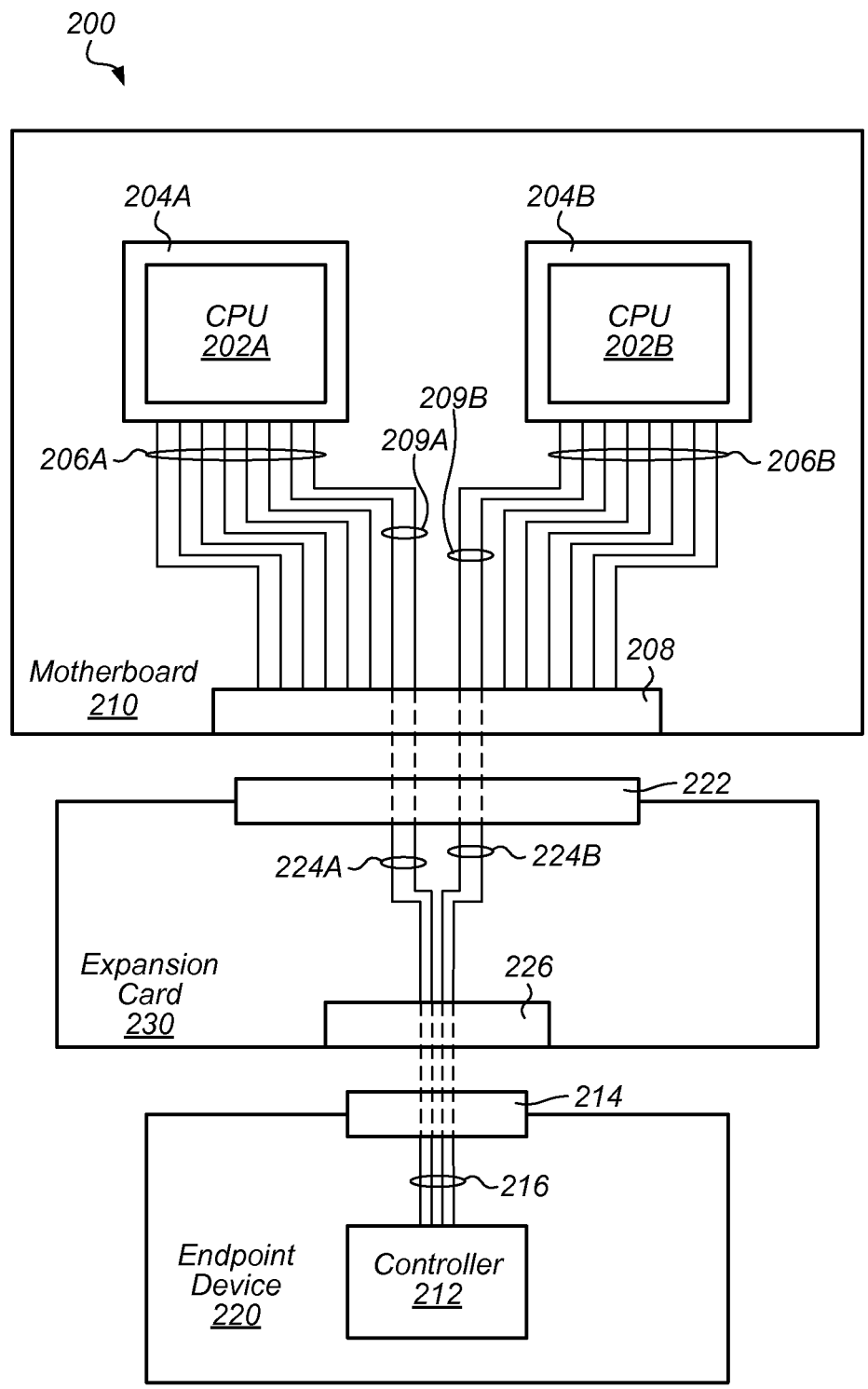
FIG. 2 illustrates a computer system which includes a motherboard, expansion card, and endpoint device configured to establish symmetrical serial links between multiple processor devices and the endpoint device via a limited selection of serial channels included on the motherboard, according to some embodiments.

FIG. 2 illustrates a computer system which includes a motherboard, expansion card, and endpoint device configured to establish symmetrical serial links between multiple processor devices and the endpoint device via a limited selection of serial channels included on the motherboard, according to some embodiments. The computer system 200 illustrated in FIG. 2 can be included in any of the embodiments herein.

Computer system 200 includes a motherboard 210, expansion card 230, and endpoint device 220 which can be coupled together to establish symmetrical serial links between multiple processor devices coupled to the motherboard and the endpoint device. Such symmetrical serial links can enable the endpoint device to communicative simultaneously with the multiple processor devices. In some embodiments, such an endpoint device can control the multiple processor devices to emulate one or more instances of computer hardware, and the simultaneous communication between the endpoint device and the processor devices can enable improved performance of such emulation, relative to asymmetrical links between the multiple processor devices and the endpoint device.

In some embodiments, a motherboard includes serial links, also referred to herein as sockets, to which processor devices can be coupled. A serial link can include connectors which each couple with a separate signal pathway connector of a coupled processor device, thereby enabling communication by the separate signal pathways of the processor device via separate communication channels coupled to the separate signal pathway connectors of the serial link. In the illustrated embodiment, for example, motherboard 210 includes two separate serial links 204A-B which are each configured to couple with separate processor devices 202A-B. In some embodiments, each serial link is configured to couple with a certain quantity of signal pathways of each processor channel. For example, each serial link can comprise a PCIe serial link which is configured to couple to eight signal pathways, also referred to as a x8 serial link.

In some embodiments, a motherboard includes a set of serial channels, also referred to herein as point-to-point serial links, via which data can be communicated via serial communication. An individual serial channel can include, in some embodiments, a signal trace on the motherboard. In some embodiments, a serial channel includes an individual PCIe lane. A set of serial channels can couple separate ports and interfaces on the motherboard. In some embodiments, a set of serial channels couple a serial link and at least a certain portion of a serial link interface on the motherboard, and each individual serial channel in the set of serial channels can be coupled to a separate signal path connector on the serial link, so that each serial channel communicatively couples a separate signal pathway of a processor device coupled to the serial link with a separate portion of the serial link interface, and the set of serial channels can collectively communicatively couple the processor device with at least a portion of the serial link interface.

In some embodiments, a motherboard includes separate sets of serial channels which couple separate portions of an individual serial link interface with separate serial links, so that the separate sets of serial channels are configured to communicatively couple separate processor devices, coupled to separate serial links, with the individual serial link interface, thereby enabling serial links between each of the processor devices and one or more devices coupled to the serial link interface to be established.

In some embodiments, separate sets of serial channels are symmetrical in structure, such that data communicated simultaneously from separate processor devices via the separate sets of serial channels arrive at the serial link interface simultaneously, and data communicated simultaneously from the serial link interface via the separate sets of serial channels arrive at the separate processor devices simultaneously.

In the illustrated embodiment, motherboard 210 includes an individual serial link interface 208 and two separate sets 206A-B of serial channels which couple the interface 208 with separate serial links 204A-B, such that motherboard 210 is configured to communicatively couple the two processor 202A-B to the interface 208 via separate sets 206A-B of serial channels. In the illustrated embodiment, each set of serial channels includes eight distinct serial channels. It will be understood that various numbers of serial channels can be included in a set of serial channels. As shown, the two sets 206A-B of serial channels are symmetrical sets, such that data communication between processors 202A-B and interface 208 via the separate sets 206 of channels is received simultaneously. In some embodiments, a serial link interface on a motherboard, including the illustrated interface 208, includes a serial expansion slot interface which is configured to couple with one or more serial edge connectors. As discussed further below, the interface 208 can include multiple individual connectors to which separate serial channels in the sets 206 are coupled, where each individual connector is configured to couple to an individual connector on another serial link interface which can be coupled with interface 208.

In some embodiments, the expansion card is configured to communicatively couple a limited selection of serial channels, of each of the separate sets of serial channels on the motherboard, with an endpoint device interface, such that the expansion card is configured to establish symmetrical serial links between the multiple processor devices on the motherboard with the endpoint device via symmetrical limited selections of serial channels, of the symmetrical sets of motherboard serial channels.

In the illustrated embodiment, expansion card 230 includes a serial link interface 222 which can couple with interface 208 of the motherboard 210, an endpoint device interface configured to couple with an interface 214 of device 220, and sets of expansion card serial channels 224A-B which communicatively couple at least a portion of interface 222 with interface 226. As shown, the sets of serial channels 224A-B are symmetrical and are each configured to communicatively couple with a separate limited selection 209A-B of the separate sets 206A-B of motherboard serial channels which expansion card serial link interface 222 is coupled to interface 208. As a result, coupling interfaces 222, 208 can result in communicatively coupling each of the processor devices 202A-B with at least the endpoint device interface 226 of the expansion card via the separate symmetrical limited selections 209A-B of motherboard serial channels from the separate sets 206A-B and the separate symmetrical sets 224A-B of expansion card serial channels coupled to the limited selections 209A-B via the coupled interfaces 208, 222. In some embodiments, the expansion card serial link interface 222 includes a serial edge connector which includes multiple signal traces which are each coupled to a separate expansion card serial channel and which is further configured to physically couple with one or more potions of the interface 208, which can include a serial expansion slot connector.

Endpoint device 220 can include one or more instances of controller circuitry 212 which is communicatively coupled to the interface 214 via one or more instances of serial channels 216. Coupling device 220 with interface 226 of the expansion card 230 can communicatively couple the controller 212 of the endpoint device 220 with each of the processor devices 202A-B via separate symmetrical serial links, thereby enabling simultaneous communication between each of the processor devices 202A-B and controller 212 and further enabling simultaneous control, by controller 212, of bother processor devices 202A-B.

Figure 3:
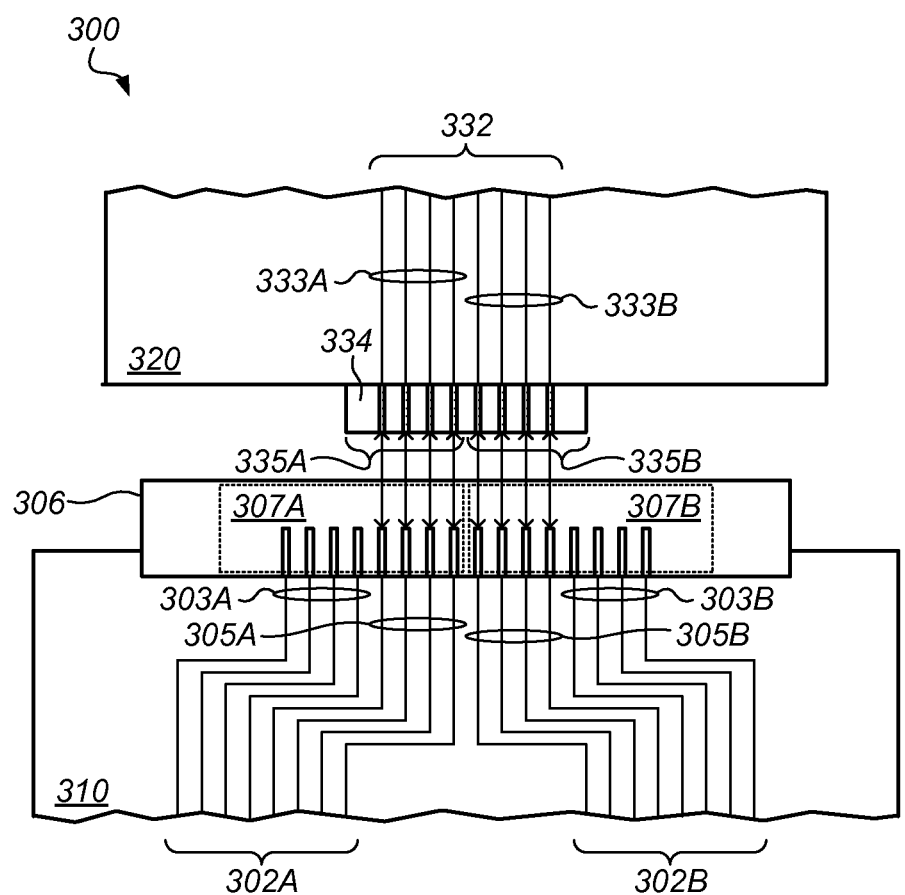
FIG. 3 illustrates serial link interfaces of a motherboard and device which can be coupled in the serial link interface of the motherboard to communicatively couple limited selections of multiple symmetrical sets of motherboard serial channels with multiple serial channels of the device, according to some embodiments.

FIG. 3 illustrates serial link interfaces of a motherboard and device which can be coupled in the serial link interface of the motherboard to communicatively couple limited selections of multiple symmetrical sets of motherboard serial channels with multiple serial channels of the device, according to some embodiments. The motherboard and device shown in FIG. 3 can be included in any of the embodiments herein.

Motherboard 310 of Computer system 300 includes two separate, symmetrical sets 302A-B of serial channels which are both coupled to a serial link interface 306 of the motherboard. Each set includes 8 serial channels, and the serial link interface 308 includes multiple separate connectors 307A-B which are each coupled to a separate individual serial channel, so that one portion 307A of the interface 306 is coupled to one set 302A of channels and the other portion 307B is coupled to the other set 302B of channels. Each separate set of channels can be coupled to a separate processor device via a separate serial link on the motherboard 310. In some embodiments, the interface 306 includes a serial expansion slot interface. For example, the interface 306 can include a PCIe x16 expansion slot, with 16 signal traces 307A-B, while the separate sets 302A-B of serial channels can include separate sets 302A-B of PCIe lanes.

Device 320 can include one or more of an expansion device included in any of the embodiments herein, an endpoint device included in any of the embodiments herein, some combination thereof, etc. Device 320 includes serial channels 332 and a serial link interface 334 which includes separate connectors 335A-B which are each coupled to a separate serial channel 332. The interface 334 can be configured to be coupled with the interface 306 of the motherboard 310, and each connector 335 can be configured to couple with a separate individual connector 307 of the interface 306, such that coupling the interface 334 of the device 320 to the interface 306 of motherboard 310 results in coupling the sets 335A-B of connectors of interface 334 with at least some of the connectors 307 of interface 306, thereby communicatively coupling the serial channels 332 of device 320 with at least some of the serial channels of the motherboard. In some embodiments, the interface 334 includes a serial edge connector interface. For example, the interface 334 can include a PCIe x8 edge connector, with 8 signal traces 335A-B, while the serial channels 332 can include PCIe lanes.

In some embodiments, one or more sets of serial channels on a device configured to be coupled to a motherboard serial link interface are configured to be coupled to symmetrical limited selections of serial channels of separate symmetrical sets of motherboard serial channels. In the illustrated embodiment, for example, the device 320 includes an interface 334 which includes connectors 335 which are fewer in quantity than the connectors 307 included in the motherboard serial link interface 306, such that the device interface 334 is configured to couple the serial channels 332 to a limited selection of the motherboard serial channels. As shown, the sets 302A-B of motherboard serial channels couple to two separate contiguous sets 307A-B of connectors on the interface 306; in some embodiments this separate sets 307 of connectors are encompassed by separate portions of the interface 306 which can be referred to as "upper" and "lower" portions of the interface. As further shown, the separate sets 307A-B of connectors are adjacent, such that a serial link interface coupled with interface 306 can couple with at least some of the "lower" portion 307A of connectors and at least some of the "upper portion" 307B of connectors, such that the interface couples with at least some serial channels of both sets 302A-B. In the illustrated embodiment, the device interface 334 is positioned to couple separate sets 335A-B of connectors with separate corresponding connectors 307A-B of the interface, so that connectors 335A couple with interface connectors 307A which are coupled to serial channels 305A in set 302A and that connectors 335B couple with interface connectors 307B which are coupled to serial channels 305B in set 302B. As a result, serial channel sets 333A-B of device 320 are communicatively coupled with the respective limited selections 305A-B of serial channels of the sets 302A-B, where the limited selections 305A-B are symmetrical. Furthermore, because interface 334 is configured to couple to a limited selection of connectors 307, serial channels 303A-B are not connected to device 320.

Figure 4:
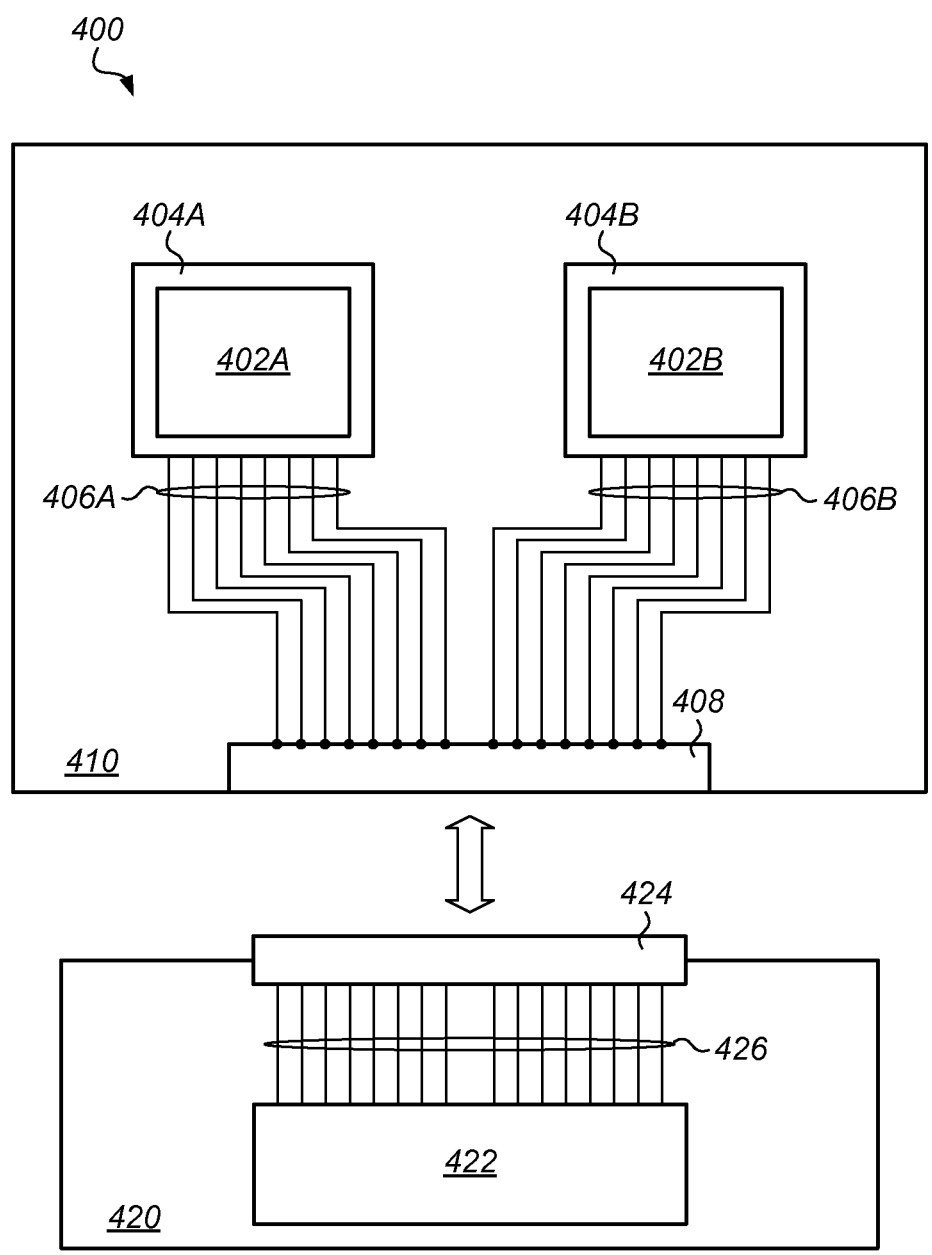
FIG. 4 illustrates a computer system which includes a motherboard and endpoint device configured to establish symmetrical serial links between multiple processor devices and the endpoint device via an entirety of serial channels included on the motherboard, according to some embodiments.

FIG. 4 illustrates a computer system which includes a motherboard and endpoint device configured to establish symmetrical serial links between multiple processor devices and the endpoint device via an entirety of serial channels included on the motherboard, according to some embodiments. The computer system 400 illustrated in FIG. 4 can be included in any of the embodiments herein.

In some embodiments, a motherboard includes a serial link interface which is configured to be physically coupled with an interface of an endpoint device, such that multiple processor devices coupled to the motherboard are communicatively coupled to the endpoint device via symmetrical serial links. The endpoint device can include a serial link interface configured to couple with the motherboard serial link interface. For example, in the illustrated embodiment, computer system 400 includes a motherboard 410 which includes serial links 404A-B configured to be coupled with separate processor devices 402A-B and a serial link interface 408 which is communicatively coupled to the serial links 404A-B via separate symmetrical sets 406A-B of serial channels, where the serial link interface 408 is configured to physically couple with an interface 424 of an endpoint device to communicatively couple one or more components of the endpoint device to the processor devices.

In some embodiments, the motherboard is configured to communicatively couple multiple processor devices to an endpoint device via an entirety of the serial channels coupling the respective processor devices to the serial link interface. The endpoint device can include an interface which is configured to couple with each connector included in the serial link interface, and each of the serial channels in the sets of motherboard serial channels can be coupled to a separate one of the serial link interface connectors, so that coupling the endpoint device to the serial link interface includes communicatively coupling the endpoint device to each of the motherboard serial channels coupled to the serial link interface. In the illustrated embodiment, for example, endpoint device 420 includes an interface 424 which is configured to couple with each of the serial channels in sets 406A-B via interface 408, and endpoint device 420 includes a component 422 which is configured to be communicatively coupled to each of the motherboard serial channels 406A-B via channels 426, interface 424, and interface 408.

Figure 5:
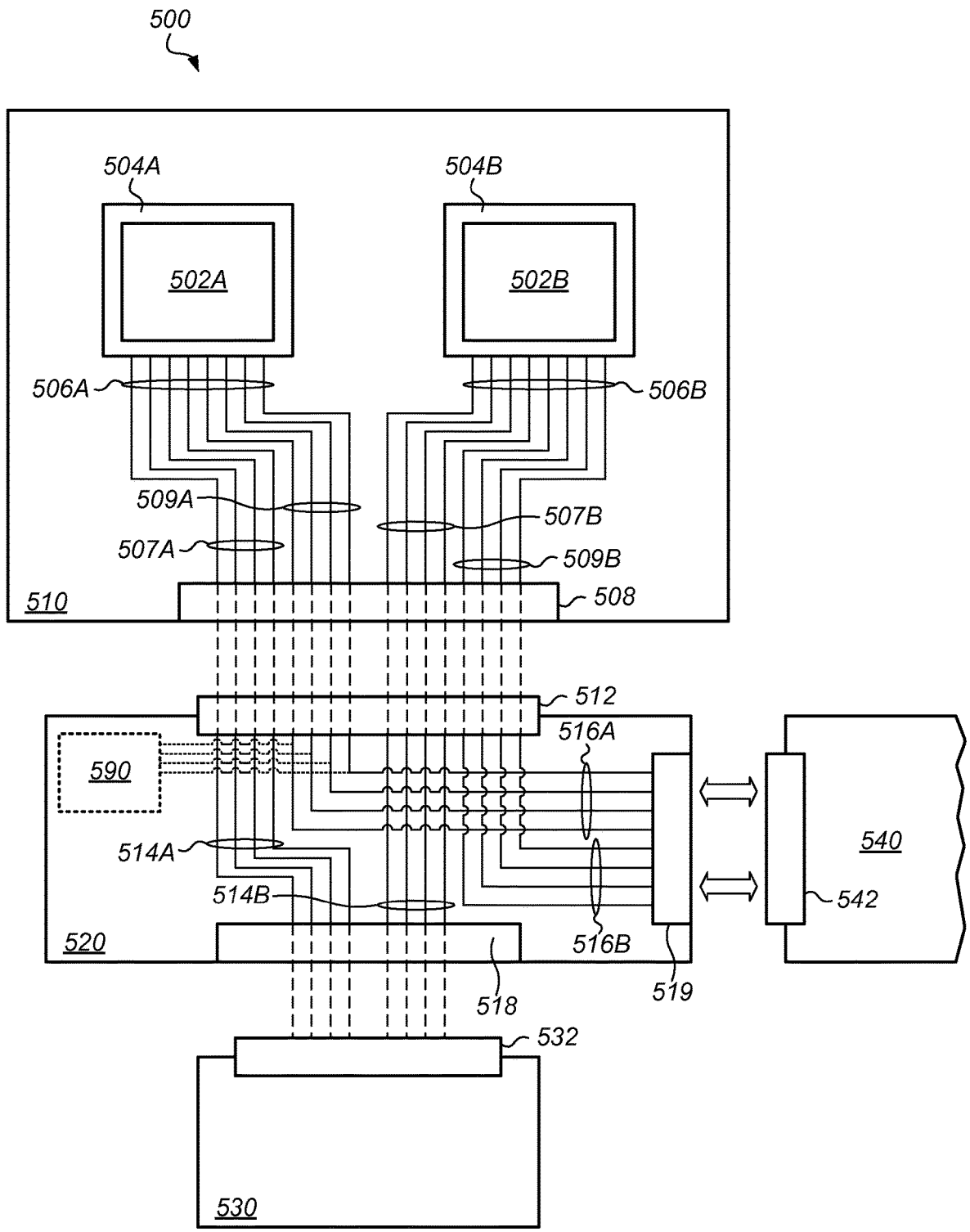
FIG. 5 illustrates a computer system which includes a motherboard, expansion card, endpoint device, and expansion device, according to some embodiments.

FIG. 5 illustrates a computer system which includes a motherboard, expansion card, endpoint device, and expansion device, according to some embodiments. The computer system 500 illustrated in FIG. 5 can be included in any of the embodiments herein.

In some embodiments, a computer system includes an expansion card which includes multiple device interfaces which can each couple with different devices, and coupling the expansion card with a motherboard can configure processor devices coupled to the motherboard to be communicatively coupled to multiple devices via the expansion card. In some embodiments, the expansion card is configured to communicatively couple each of the processor devices coupled to a motherboard to multiple devices, via serial channels on the expansion card.

In the illustrated embodiment, computer system 500 includes a motherboard which includes serial links 504A-B configured to be coupled with separate processor devices 502 and a serial link interface 508 which is communicatively coupled to the serial links 504 via separate symmetrical sets 506A-B of serial channels, where the serial link interface 508 is configured to physically couple with an interface 532 of an endpoint device to communicatively couple one or more components of the endpoint device to the processor devices.

Computer system 500 further includes an expansion card 520 which includes a serial link interface 512, an endpoint device interface 518, an additional device interface 519, sets 514A-B of serial channels which couple interfaces 512, 518 and sets 516A-B of serial channels which couple interfaces 512, 519. Each set 514A, 516A of serial channels is configured to couple to separate selections 507A, 509A of the set 506A which are coupled to serial link 504A. Each set 514B, 516B of serial channels is configured to couple to separate selections 507B, 509B of the set 506B which are coupled to serial link 504B. As a result, when the serial link interface 512 of the expansion card 520 is coupled to the serial link interface 508 of the motherboard 510, each of the processor devices 502A-B coupled to the serial links 504A-B are configured to be communicatively coupled to both an endpoint device 530 coupled to the endpoint device interface 518 and an interface 542 of an additional expansion device 540 coupled to the additional device interface 519.

In some embodiments, an expansion card is configured to couple to one or more various additional expansion devices.

Such additional expansion devices can include a network communication device, also referred to herein as a networking card. Such expansion devices can include a data storage device, which can include a hard disk data storage device, a solid state data storage device, an instance of processing circuitry, a graphics card, a video card, some combination thereof, etc.

In some embodiments, an expansion card includes one or more additional expansion devices which are coupled to the expansion card. Such additional devices, which can be referred to as "embedded devices", can be communicatively coupled to one or more processor devices included in a motherboard via a set of expansion card serial channels coupling the embedded device to the serial link interface of the expansion card. The expansion card can be configured to communicatively couple the embedded device to one or more particular processor devices. For example, as shown in FIG. 5, expansion card 520 can include an embedded device 590 which is communicatively coupled to interface 512 via the set 516A of serial channels, so that the card 520 is configured to communicatively couple the embedded device 590 to processor device 502A via the limited selection 509A of channels 506A linking the processor device 502A to the interface 508. In some embodiments, device 590 is coupled to interface 512 via serial channels 516A, 516B, so that card 520 is configured to communicatively couple device 590 to processor devices 502A, 502B via channels 509A-B and interfaces 508, 512.

Figure 6:
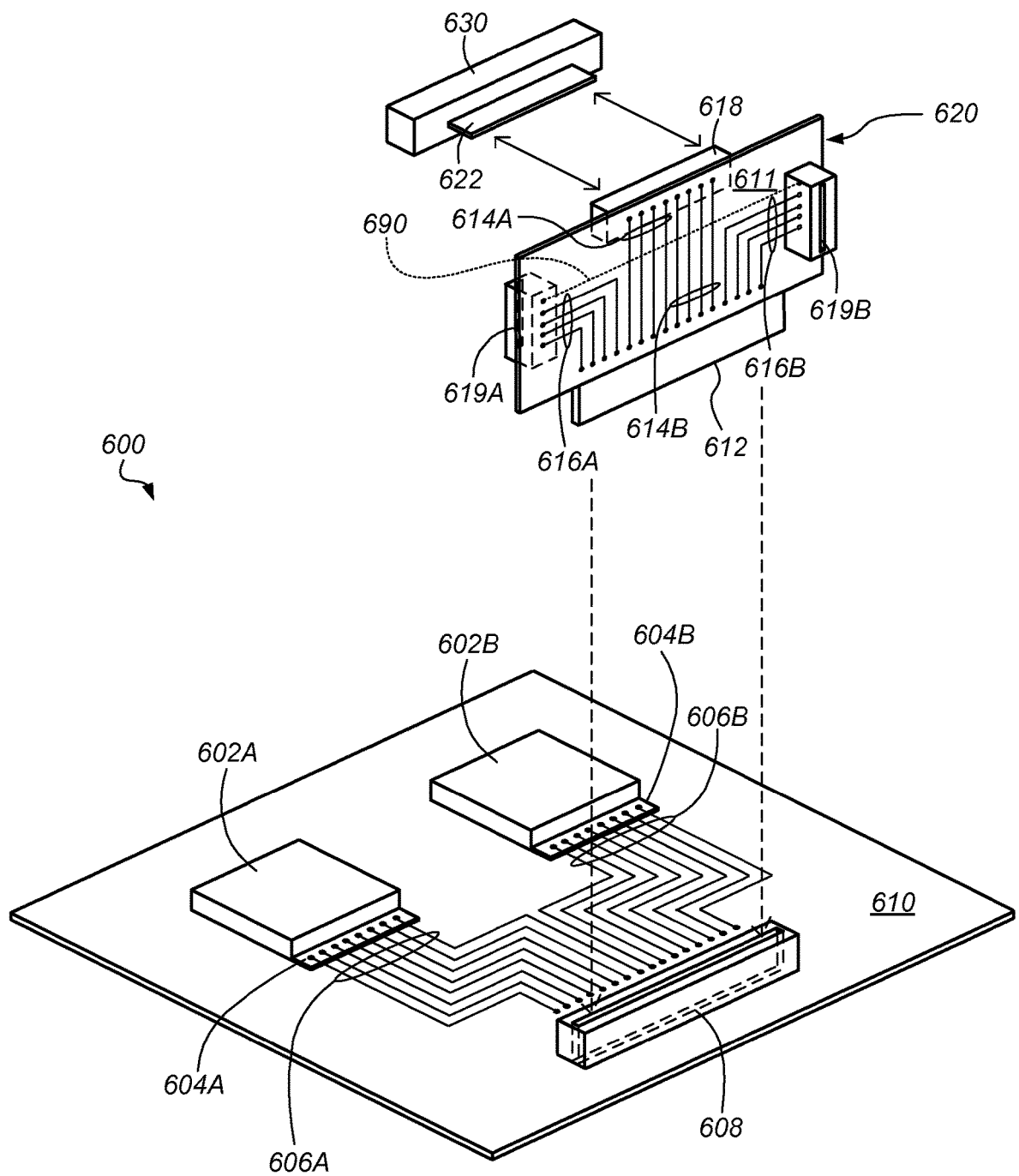
FIG. 6 illustrates a perspective view of a computer system which includes a motherboard, riser card, and endpoint device configured to establish symmetrical serial links between multiple processor devices and the endpoint device via a limited selection of serial channels included on the motherboard, according to some embodiments.

FIG. 6 illustrates a perspective view of a computer system which includes a motherboard, riser card, and endpoint device configured to establish symmetrical serial links between multiple processor devices and the endpoint device via a limited selection of serial channels included on the motherboard, according to some embodiments. The computer system 600 illustrated in FIG. 6 can be included in any of the embodiments herein.

In some embodiments, the serial link interface on a motherboard is an expansion slot interface, and the expansion card described herein is a riser card which is configured to be coupled to the motherboard via the expansion slot interface, such that the riser card extend orthogonally with regard to the motherboard to which the riser card is coupled. In addition, the riser card can include one or more endpoint device interfaces, expansion device interfaces, etc. which are configured to couple to devices extending orthogonally to the circuit board comprised in the riser card and thus parallel to the motherboard when the riser card is coupled to the expansion slot interface of the motherboard.

In the illustrated embodiment of FIG. 6, computer system 600 includes a motherboard 610, riser card 620, and endpoint device 630. The motherboard 610 includes multiple processor devices 602 coupled to separate serial links 604A-B on the motherboard, and separate symmetrical sets 606A-B of serial channels link the serial links 604A-B, and thus the coupled processor devices 602A-B, to the serial link interface 608 on the motherboard, where the serial link interface 608 is an expansion slot interface configured to couple with one or more edge connector interfaces. In some embodiments, interface 608 is a PCIe expansion slot interface.

As shown, the riser card 620 includes a circuit board 611, serial link interface 612, serial channels 614A-B, 616A-B, endpoint device interface 618, and additional expansion device interfaces 619A-B. As shown, the serial link interface 612 on the riser card can include an edge connector interface configured to couple with the expansion slot interface 608 of the motherboard to communicatively couple the serial channels 614, 616 of the riser card with at least some of the serial channels in the sets 606A-B on the motherboard, thereby coupling to the processor devices 602A-B.

In the illustrated embodiment, the serial channels 614A-B on the riser couple the endpoint device interface 618 and the riser card serial link interface 612, and each separate set 614A-B of serial channels is configured to couple with a separate limited selection of motherboard serial channels of a separate set 606A-B of motherboard serial channels when interface 612 is coupled with interface 608. As a result, the serial channels 614A-B are configured to communicatively couple processor devices 602A-B with end point device 630 via symmetrical serial links when the motherboard 610, riser card 620, and endpoint device are coupled together via interfaces 608, 612, 618.

In some embodiments, an expansion card is configured to communicatively couple symmetrical limited selections of separate sets of motherboard serial channels coupled to separate processor devices to a common endpoint device and is further configured to communicatively couple motherboard serial channels coupled to separate processor devices to separate expansion devices coupled to the expansion card. In the illustrated embodiment, for example, the serial channels 616A-B on the riser card couple the separate additional expansion device interfaces 619A-B and the riser card serial link interface 612, and each separate set 616A-B of serial channels is configured to couple with a separate limited selection of motherboard serial channels of a separate set 606A-B of motherboard serial channels when interface 612 is coupled with interface 608. As a result, the serial channels 616A-B are configured to communicatively couple separate processor devices 602A-B with separate expansion devices via separate additional expansion device interfaces 619A-B when the motherboard 610 and riser card 620 are coupled together via interfaces 608, 612.

As further shown in the illustrated embodiment, motherboard 610 is configured to couple with the riser card 620, via interface 608, such that the riser card extends orthogonally from the surface of the motherboard when the riser card 620 is coupled to interface 608. In addition, the riser card is configured to couple with the endpoint device 630 and one or more expansion devices, via one or more of interfaces 618, 619A-B, such that the endpoint device and one or more expansion devices extend orthogonally from the surface of the riser card, and thus parallel to the motherboard, when the devices are coupled to the riser card and the riser card is coupled to the motherboard.

In some embodiments, an expansion card includes a set of serial channels which communicatively couple two or more separate expansion card interfaces, endpoint device interfaces, some combination thereof, etc. included on the expansion card, such that the expansion card is configured to communicatively couple two or more devices, coupled to the expansion card via the two or more separate expansion card interfaces, endpoint device interfaces, some combination thereof, etc., independently of a motherboard to which the expansion card is coupled. For example, as shown in FIG. 6, expansion card 620 can include a serial channel 690 which communicatively couples interfaces 619A-B, so that devices coupled separately to interfaces 619A-B can be communicatively coupled together via channel 690, independently of the motherboard 610. In some embodiments, channel 690 can communicatively couple an expansion card interface 619 and an endpoint device interface 618. The one or more serial channels 690 can include one or more various serial channels, including one or more PCIe lanes, one or more power transmission lines, one or more communication conduits, some combination thereof, etc.

Figure 7:
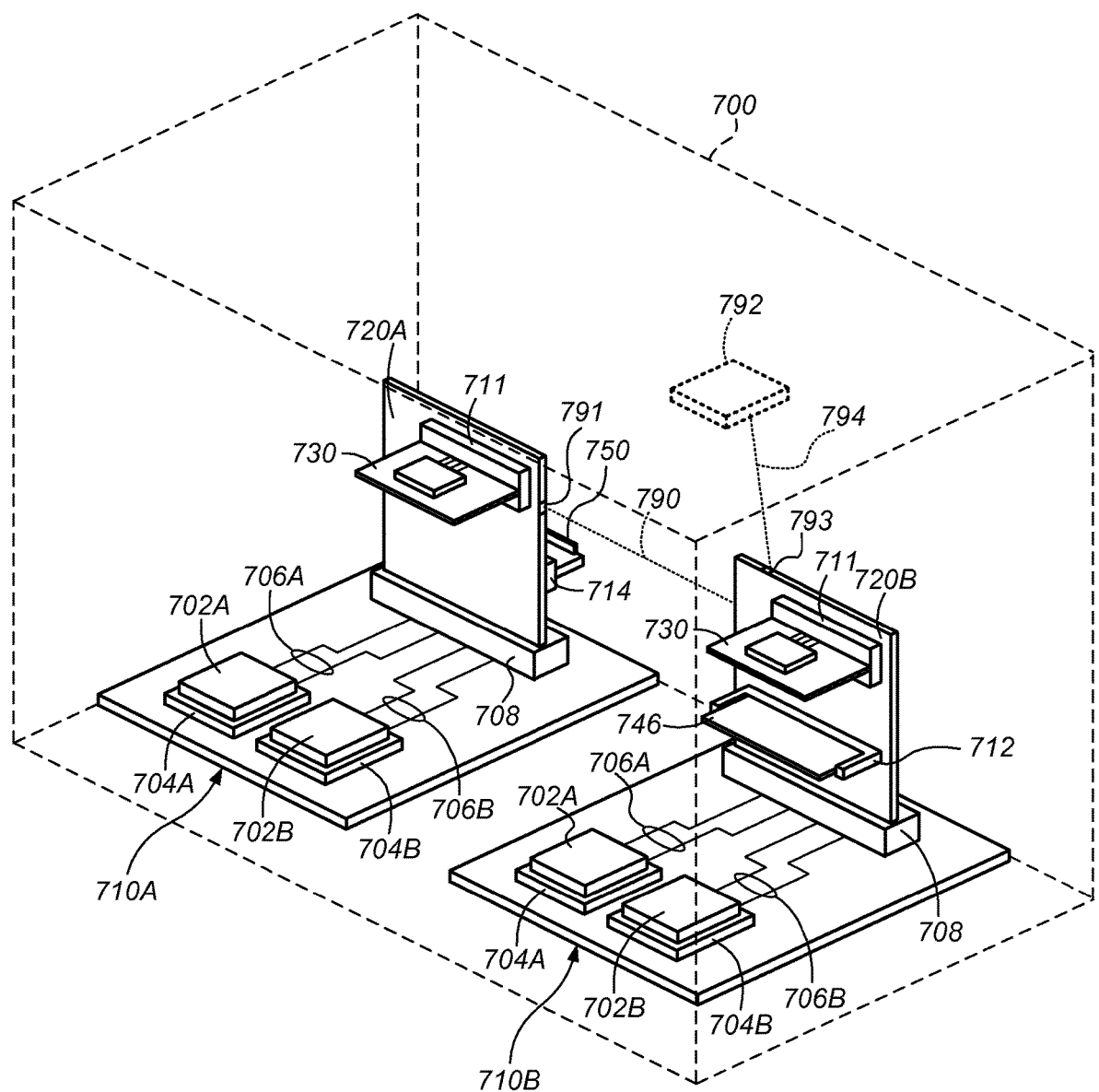
FIG. 7 illustrates a perspective view of a computer system which includes multiple motherboards which each include multiple processor devices communicatively coupled to a separate riser card and endpoint device, according to some embodiments.

FIG. 7 illustrates a perspective view of a computer system which includes multiple motherboards which each include multiple processor devices communicatively coupled to a separate riser card and endpoint device, according to some embodiments. The computer system 700 included in the FIG. 7 can include any of the computer systems included in any of the embodiments herein.

In some embodiments, a computer system includes multiple motherboards which each include multiple serial links and an individual serial link interface, such that each separate motherboard in a computer system can be coupled, via the respective serial link interface, to a separate endpoint device, expansion card, some combination thereof, etc. In some embodiments, separate motherboards in a computer system can be coupled to different combinations of expansion cards and devices coupled to the expansion cards, such that the separate sets of processor devices coupled to separate motherboards are communicatively coupled to different sets of endpoint devices, expansion devices, etc. In some embodiments, because the various devices, expansion cards, etc. can be coupled to the processors on a motherboard via the individual serial link interface on the motherboard, a given motherboard serial link interface can be interchangeably coupled to one or more various different expansion cards which include different sets of device interfaces, so that processor devices coupled to the given serial link interface can be interchangeably communicatively coupled to different sets of devices. Such interchangeability can include swapping one or more expansion cards coupled to the serial link interface of a motherboard.

In some embodiments, because the motherboard is configured to interchangeably couple the multiple processor devices coupled thereto to various different expansion cards which are configured to couple with various different sets of devices, where coupling different devices to the processor devices can result in the computer system which includes the motherboard providing different levels of computing capacity and performance, a computer system which includes one or more motherboards, where the motherboards each include multiple processor device serial links and an individual serial link interface coupled to the multiple serial links, can be configured to provide various different levels of computing capacity performance based on coupling different expansion cards to the serial link interfaces of the motherboards. As a result, computer systems which include uniform motherboards can be quickly and interchangeably configured and re-configured to provide computing capacity which conforms to various specific computing capacity requirements for the specific computer systems, as various expansion devices can be quickly and easily coupled to the processor devices on the motherboards via coupling expansion cards to the serial link interfaces on the motherboards and coupling one or more expansion devices, endpoint devices, etc. to the expansion cards.

In the illustrated embodiment, computer system 700 includes multiple motherboards 710A-B, where each separate motherboard includes multiple serial links 704A-B to which multiple processor devices 702A-B are separately coupled, an individual serial link interface 708, and multiple separate and symmetrical sets 706A-B of serial channels linking the serial links 704A-B to the serial link interface. As further shown, separate expansion cards, here shown as riser cards 720, can be coupled to each of the serial link interfaces of the separate motherboards 710A-B, and one or more expansion devices, endpoint devices, etc. 730-750 can be coupled to the interfaces 711-714 of the expansion cards 720, so that one or more of the processor devices 702A-B on the respective coupled motherboard are communicatively coupled to one or more of the coupled devices 730, 740, 750, thereby configuring the computer system 700 to provide computing capacity which conforms to one or more requirements. Such configuring can include coupling different expansion cards, which include different sets of device interfaces, to different motherboards in a common computer system. For example, as shown in the illustrated embodiment, the serial link interface 708 of motherboard 710A is coupled with an expansion card 720A which includes an endpoint device interface 711 and a first particular additional expansion device interface 714 to which a first additional expansion device 750 can be coupled, while the serial link interface 708 of motherboard 710B is coupled with a different expansion card 720B which includes an endpoint device interface 711 and a second particular additional expansion device interface 712 to which a second additional expansion device 746 can be coupled. The first and second expansion devices can be different devices, for example additional device 750 can include a networking card and additional device 746 can include a solid state data storage device, such that coupling the different expansion cards 720A-B to the serial link interfaces of the separate motherboards 710A-B enables the sets of processor devices 702 on the separate respective motherboards can be coupled to different additional expansion devices 750, 746 and can, in some embodiments, perform different computing operations.

In some embodiments, two or more expansion cards are configured to couple to a communication conduit, including one or more instances of communication cabling, which communicatively couple the two or more expansion cards together. As shown in FIG. 7, the expansion cards 720A-B can each include a separate communication cable interface 791 which is configured to communicatively couple the separate expansion cards 720A-B to an instance of communication cabling 790 which extends between the separate cards 720A-B and communicatively couples at least some portion of the expansion cards 720A-B together. The cabling 790 can communicatively couple separate interfaces 711, 714, 712 on separate cards 720A-B together, so that devices 730, 750, 746 coupled to separate expansion cards can be communicatively coupled tougher via the at least one instance of communication cabling 790. Each communication cable interface included in an expansion card can be coupled to one or more sets of serial channels included in the expansion card, where the one or more sets of serial channels communicatively couple the communication cable interface to one or more device interfaces, serial link interfaces, etc. included in the expansion card.

In some embodiments, an expansion card is configured to couple to a device which is separate from the expansion card and the motherboard to which the expansion card is coupled via one or more conduits, including one or more instances of communication conduits, power transmission lines, etc., which can communicatively couple, electrically couple, some combination thereof, etc. the expansion card to the separate device. The expansion card can include a communication cable interface which is communicatively couple to one or more interfaces included in the expansion card, including one or more expansion device interfaces, serial link interfaces, endpoint device interfaces, some combination thereof, etc. As shown in FIG. 7, the expansion card 720B can include a communication cable interface 793 which is configured to communicatively couple the expansion card 720B to a separate device 792 via an instance of communication cabling 794 which extends between the card 720B and the device 792, thereby communicatively coupling at least some portion of the expansion card 720B to the device 792. Where the communication cable interface included in the expansion card 720B is communicatively coupled to a serial link interface of the card 720B which is configured to couple with at least a portion of the motherboard serial link interface 708, the card 720B can be configured to communicatively couple the device 792 to one or more processor devices 702A-B included on motherboard 710B via one or more sets of serial channels 706A-B included on the motherboard, the interface 708 of the motherboard, the serial link interface of the expansion card 720B, and one or more sets of serial channels which communicatively couple the communication cable interface 793 on the expansion card to the serial link interface of the expansion card, and cabling 794.

Figure 8:
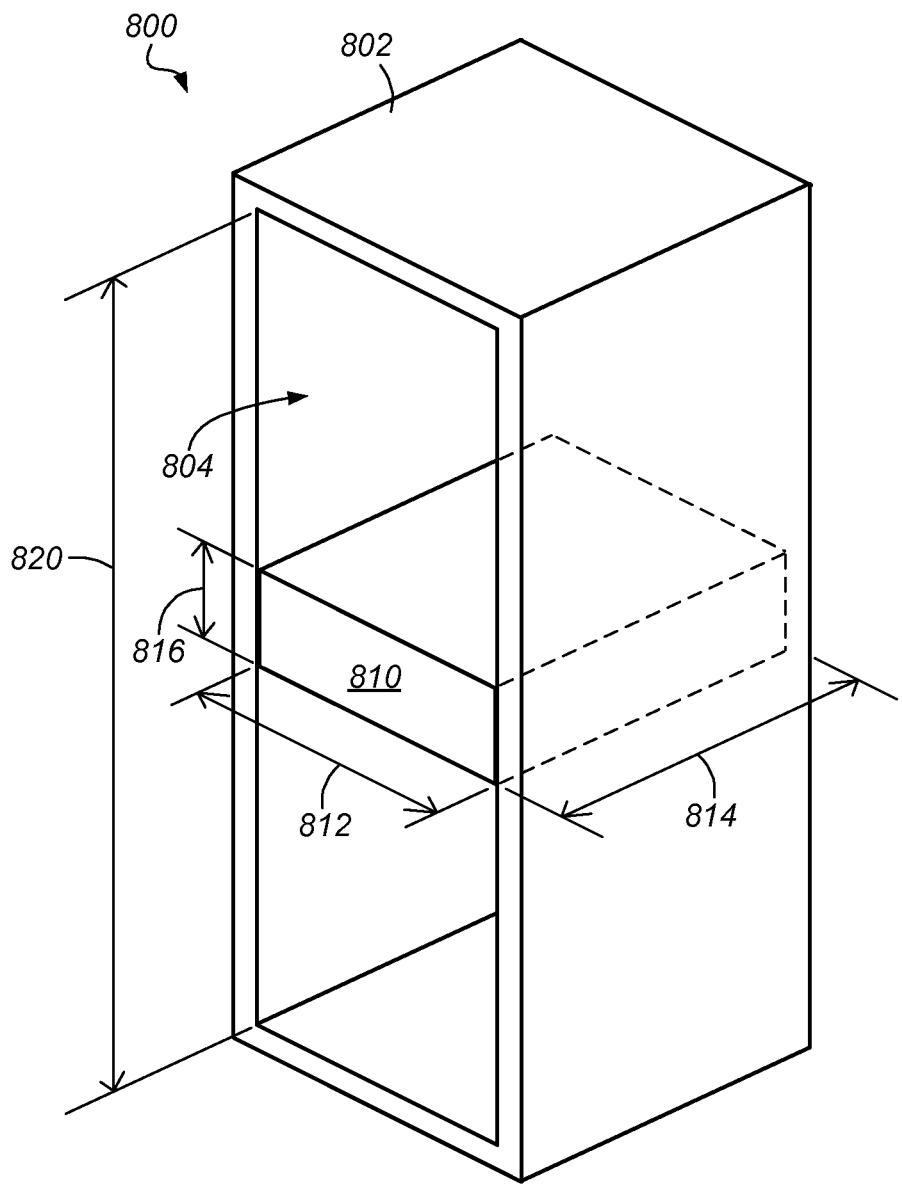
FIG. 8 illustrates a perspective view of a rack which includes a computer system which conforms to one or standardized rack computer system form factors, according to some embodiments.

FIG. 8 illustrates a perspective view of a rack which includes a computer system which conforms to one or standardized rack computer system form factors, according to some embodiments. The computer system 810 included in FIG. 8 can include any of the computer systems included in any of the embodiments herein.

In some embodiments, a computer system, which includes one or more motherboards which are configured to communicatively couple multiple processor devices to at least one endpoint device via symmetrical serial links and an individual serial link interface, is configured to be installed in one or more rack computer system frames which conform to one or more standard rack computer system form factors. In the illustrated embodiment, rack computer system frame 802 is configured to structurally support, at one or more positions within an interior space 804, one or more rack computer systems which conform to the interior dimensions of the frame. In some embodiments, the frame 802 conforms to one or more standardized rack computer system form factors, including form factors associated with 19-inch rack computer systems, 23-inch rack computer systems, etc. The interior space 804 of the rack frame, in which rack computer systems can be installed, can have a particular width 812, depth 814, and height 820. In some embodiments, the height of the interior space 804 corresponds to a particular quantity of multiples of standard rack units. For example, height 820 can be 42 rack units, such that 42 components which each are no more than 1 rack unit in height can be vertically stacked within the interior space 804.

In the illustrated embodiment, a computer system 810, which can include any of the embodiments of computer systems described herein, is mounted in a position in the interior space of the rack 802. In some embodiments, the computer system conforms to one or more dimensions of the interior space. For example, as shown, the computer system 810 has a width which conforms to the full width 812 of the interior space 804 and a depth which corresponds to the full depth 814 of the interior space, such that the computer system 810 extends along the full width and depth of the rack computer system. Where the rack computer system frame 802 conforms to a standardized rack computer system form factor, the computer system 810 has a width and depth which at least partially conforms to the standardized rack computer system form factor.

In some embodiments, a computer system which includes multiple motherboards which each include multiple serial links and an individual serial link interface configured to link the serial links to an endpoint device can occupy a smaller amount of space, relative to a computer system which includes multiple motherboards which each include multiple serial links and multiple separate serial link interfaces which are configured to link separate serial links to one or more devices. For example, where the computer system 810 includes two motherboards which each include two serial links and an individual serial link interface, similarly to the computer system 700 illustrated in FIG. 7, the computer system 810 can have a height 816 which does not exceed 1.5 rack units, where a computer system which includes multiple motherboards which each include multiple serial links and multiple separate serial link interfaces which are configured to link separate serial links to one or more devices can have a greater height, including a height of 2 rack units. As a result, computer systems which include the above-described motherboards, which themselves include multiple serial links and an individual serial link interface, can provide higher computing density. For example, up to 28 computer systems 810 having widths and depths which extend along the full width 812 and full depth 814 of the interior space and individual heights which do not exceed 1.5 rack units can be vertically arranged within the interior space 804, while no more than 21 computer systems having widths and depths which extend along the full width 812 and full depth 814 of the interior space and individual heights 816 of 2 rack units can be vertically arranged within the interior space 804.

Figure 9:
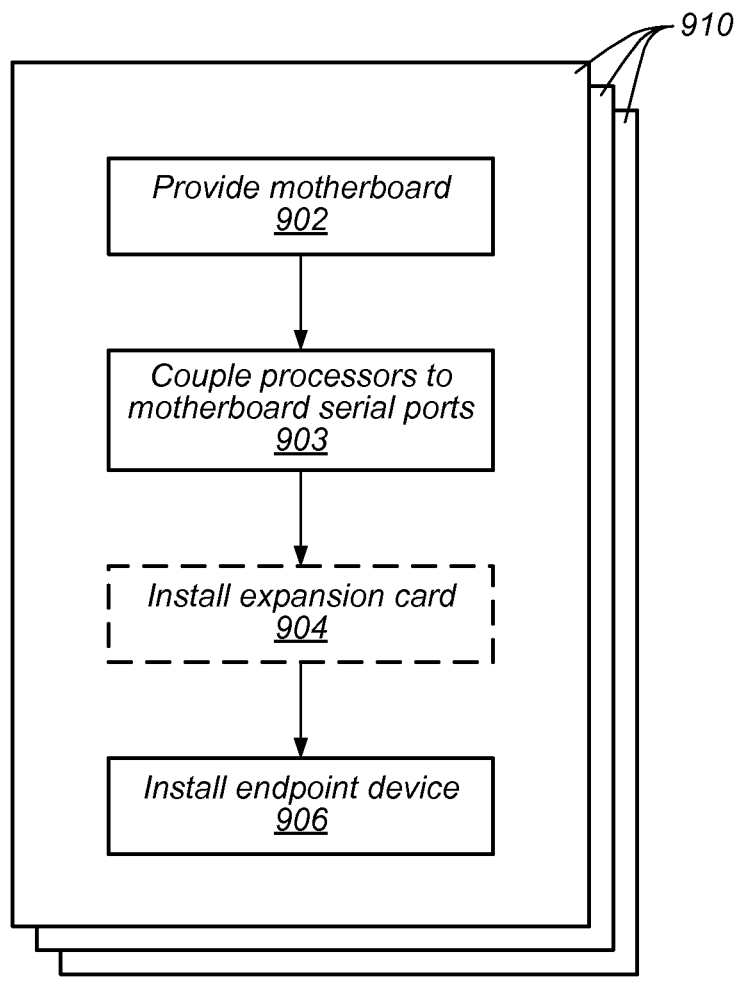
FIG. 9 illustrates configuring a computer system to enable simultaneous communication between a plurality of processor devices and an endpoint device via symmetrical communication pathways, according to some embodiments.

FIG. 9 illustrates configuring a computer system to enable simultaneous communication between a plurality of processor devices and an endpoint device via symmetrical communication pathways, according to some embodiments. The configuring can be implemented with regard to any of the embodiments of computer systems described herein.

At 902, a motherboard which includes an individual motherboard serial link interface, multiple serial links configured to couple with separate processor devices, and separate symmetrical sets of serial channels is provided. Providing a motherboard can include coupling the motherboard to a chassis of a computer system. In some embodiments, the motherboard serial link interface is configured to couple physically with one or more serial link interfaces of an endpoint device to communicatively couple the serial links with the endpoint device via symmetrical serial links In some embodiments, the motherboard serial link interface is configured to couple physically with one or more serial link interfaces of an expansion card, which includes at least one endpoint device interface configured to physically couple with at least one endpoint device, to configure the motherboard to communicatively couple the serial links with the endpoint device via symmetrical serial links.

At 903, separate processor devices are coupled to the separate serial links on the motherboard, such that the separate processor devices are communicatively coupled to the serial link interface of the motherboard via separate symmetrical sets of serial channels. In some embodiments, one or more of the processor devices is "de-featured", such that the processor device is configured to communicate via a limited selection of the signal pathways on the processor. Coupling a processor device with a serial link can include coupling separate signal pathways on the processor with separate serial channels, of a set of serial channels, coupled to the serial link.

At 904, an expansion card is installed. Such installation can include physically coupling the expansion card to the motherboard, via physically coupling at least one serial link interface of the expansion card with at least one serial link interface of the motherboard. The expansion card can include at least one serial link interface configured to couple with the motherboard serial link interface, at least one device interface configured to physically couple with one or more endpoint devices, expansion devices, etc. and at least one set of expansion card serial channels which communicatively couple the at least one expansion card serial link interface with the at least one device interface.

In some embodiments, the serial link interface of the motherboard includes multiple sets of connectors which are each coupled to separate individual motherboard serial channels, and coupling the expansion card to the motherboard includes coupling the expansion card serial link interface with a particular portion of the motherboard serial link interface, so that connectors of the expansion card serial link interface are coupled with particular connectors of the motherboard serial link interface, thereby communicatively coupling one or more sets of serial channels included on the expansion card with one or more particular selections of motherboard serial channels. In one example, the coupling includes coupling an expansion card serial link interface with a particular portion of the motherboard serial link interface which includes connectors coupled to serial channels of a particular set of serial channels which couple the respective portion of the serial link interface to a particular serial link, such that the coupling communicatively couples the serial channels of the expansion card to a particular serial link on the motherboard. In another example, the coupling includes coupling an expansion card serial link interface with a particular portion of the motherboard serial link interface which includes connectors coupled to symmetrical serial channels of multiple separate sets of serial channels which couple the respective portion of the serial link interface to multiple separate serial links, such that the coupling communicatively couples the serial channels of the expansion card to multiple serial links on the motherboard via at least some of the motherboard serial channels which communicatively couple the serial links to the motherboard serial link interface.

In some embodiments, the expansion card includes a riser card which comprises an edge connector interface which is configured to be coupled with a motherboard serial link interface which itself comprises an expansion slot interface, such that the coupled expansion card extends orthogonally from a surface of the motherboard and is configured to couple one or more devices to one or more interfaces of the expansion card at an orthogonal orientation to the surface of the expansion card.

At 906, one or more endpoint devices, additional expansion devices, etc. are installed. Such installing can include physically coupling one or more endpoint devices, expansion devices, etc. to one or more device interfaces on the expansion card, thereby communicatively coupling the coupled devices to one or more of the serial links included on the motherboard via at least some of the motherboard serial channels and expansion card serial channels. In some embodiments, the coupled device is an endpoint device and the coupling communicatively couples the endpoint device to multiple separate serial links on the motherboard via symmetrical serial links which extend through at least some of separate motherboard serial links coupling the separate serial links to an individual motherboard serial link interface, an expansion card serial link interface coupled to the motherboard serial link interface, and at least some expansion card serial channels which are communicatively coupled to the at least some motherboard serial channels via the coupled serial link interfaces.

In some embodiments, installing an expansion card at 904 is absent, such that installing an endpoint device at 906 includes physically coupling one or more endpoint devices, expansion devices, etc. to the individual motherboard serial link interface, thereby communicatively coupling the coupled devices to one or more of the serial links included on the motherboard via at least some of the motherboard serial channels. In some embodiments, the coupled device is an endpoint device and the coupling communicatively couples the endpoint device to multiple separate serial links on the motherboard via symmetrical serial links which extend through at least some of separate motherboard serial links coupling the separate serial links to the individual motherboard serial link interface.

As shown at 910, the process 902-906 can be implemented multiple times in parallel, with regard to multiple separate motherboards. In some embodiments, separate implementations 910 are performed with regard to separate motherboards installed in a common computer system. Separate implementations 910 can include coupling different expansion cards to the separate motherboards, such that separate motherboards in a computer system are configured to communicatively couple the processors coupled thereto to different devices via the expansion cards.

Figure 10:
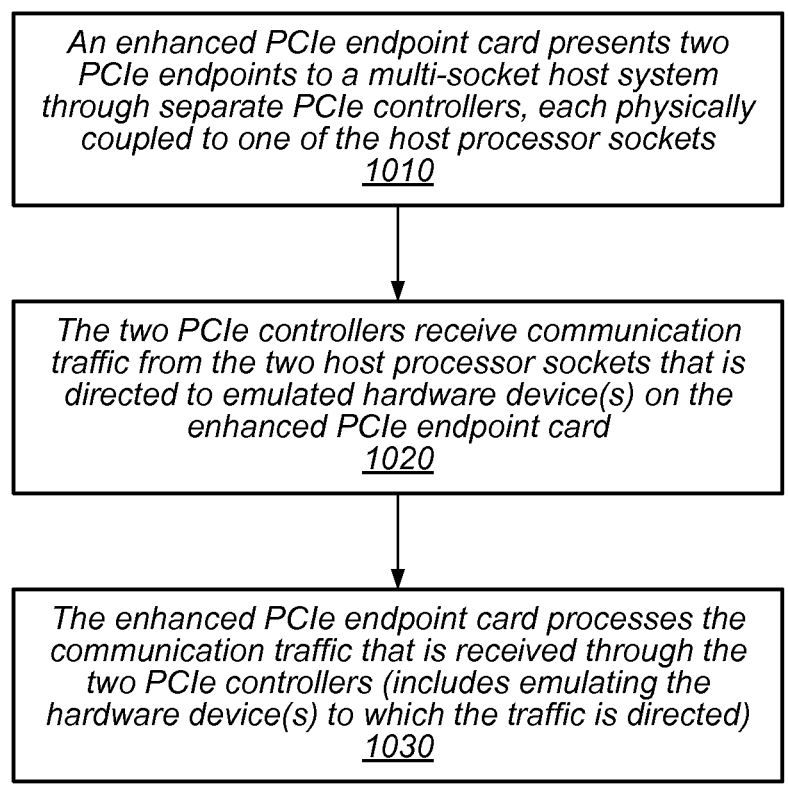
FIG. 10 illustrates presenting and utilizing an endpoint device, according to some embodiments.

FIG. 10 illustrates presenting and utilizing an endpoint device, according to some embodiments. The presenting and utilizing can be at least partially implemented by one or more computer systems, described further below. The presenting and utilizing can be implemented with regard to an endpoint device included in any of the embodiments of endpoint devices included herein.

In some embodiments, an endpoint device includes an enhanced PCIe endpoint device. One embodiment of a method for presenting and utilizing multiple endpoints on an enhanced PCIe endpoint device is illustrated by the flow diagram in FIG. 10. As illustrated at 1010, in this example, the method may include an enhanced PCIe endpoint card presenting a serial link interface, which can include one or more PCIe endpoints, to a single serial link interface through one or more separate PCIe controllers, where the one or more PCIe controllers is communicatively coupled, via symmetrical serial links to multiple serial links to which separate processor devices can be coupled. In the illustrated embodiment, each serial link, which can be referred to as a host processor socket, may include a single core processor device or a multi-core processor device, and each serial link may present its own root complex. In some embodiments, the enhanced PCIe endpoint card may present more than one PCIe endpoint to a motherboard which includes multiple serial links through one or more PCIe controllers, including multiple PCIe controllers which are each communicatively coupled to a different serial link via a separate symmetrical set of serial channels.

As illustrated, the method may include the one or more PCIe controllers receiving communication traffic (e.g., PCIe traffic) from the multiple serial links that is directed to one or more emulated hardware device(s) (e.g., PCIe devices) on the enhanced PCIe endpoint device, as in 1020. The method may also include the enhanced PCIe endpoint device processing the communication traffic that is received through the one or more PCIe controllers, which may include emulating the hardware device(s) to which the received communication traffic is directed (as in 1030).

In some embodiments, the enhanced PCIe endpoint devices described herein may include host interface circuitry that implements pointer registers and control and status registers for each of multiple transaction ring buffers instantiated in memory on the device. In response to receiving a transaction layer packet that includes a transaction, packet steering circuitry on the endpoint device may push the transaction into a particular one of the buffers, dependent on the transaction type, a routing identifier for an emulated hardware device to which it is directed, its traffic class, and/or other transaction-related parameter values. Subsequently, the transaction may be processed in software (e.g., software executing on an emulation processor on the enhanced PCIe endpoint device), which emulates the targeted hardware device. In some embodiments, the host interface circuitry may generate response completion packets for configuration requests and non-posted transactions, and may return them according to PCIe ordering rules, regardless of the order in which they were processed on the endpoint device.

In some embodiments, the systems described herein (e.g., systems that provide virtualized computing and/or storage resources to clients) may use a processor that is not coupled to the motherboard (e.g., a CPU complex that executes virtual machines on behalf of guests) to perform the emulation of PCIe compliant hardware devices (or physical and/or virtual functions thereof). For example, an enhanced PCIe endpoint device may be a PCIe card on which is built an interface that facilitates the emulation of hardware devices using a PCI pass-through to connect virtual machine guests directly over the PCI bus to the PCIe card, on which the emulation software is running In some embodiments, the enhanced PCIe endpoint devices described herein may be programmed to emulate multiple devices of the same type or of different types simultaneously.

The PCIe device emulation approach described herein may allow a wide-range of device controllers to be emulated in software on the device. This approach may allow service providers to create virtual devices (aka self-virtualizing devices), i.e., full virtual device controllers in software, which may eliminate any requirement for instantiating every potentially interesting device controller in the PCIe endpoint device. In some embodiments, the enhanced PCIe endpoint devices described herein may provide a hardware architecture that enables a high-performance, flexible platform for SR-IOV device In some embodiments, although much of the functionality of the endpoint device is implemented in hardware, the endpoint device described herein can be configured using software (e.g., by one or more configuration modules executing on the endpoint device). For example, in some embodiments, emulation code, including HW device emulation code, virtual function emulation code, physical function emulation code, some combination thereof, etc. may be written into the memory on an endpoint device, including endpoint memory on endpoint device, by software executing on the endpoint device itself or on one or more processor devices to which it is communicatively coupled in order to initialize the endpoint device for subsequent emulation of various hardware devices and virtual or physical functions thereof, e.g., by the execution of this code by a processor on the endpoint device, including an emulation processor within the endpoint SOC. In some embodiments, after initially writing emulation code into the endpoint memory, the endpoint device may be subsequently reconfigured to support the emulation of more, fewer, or different functions by writing additional code into the endpoint memory, deleting code from the endpoint memory, or overwriting the code in the endpoint memory.

In another example, software may be used to initialize (and/or subsequently reconfigure) the functionality of the hardware on an endpoint device. For example, software executing on the endpoint device itself or on one or more processor devices to which it is communicatively coupled may be configured to instantiate multiple transaction ring buffers in memory on the endpoint device (e.g., in memory within the endpoint SOC or in a separate endpoint memory), and may also be configured to write initial values into the pointer registers and the control and status registers for those ring buffers in order to configure and manage them.

Figure 11:
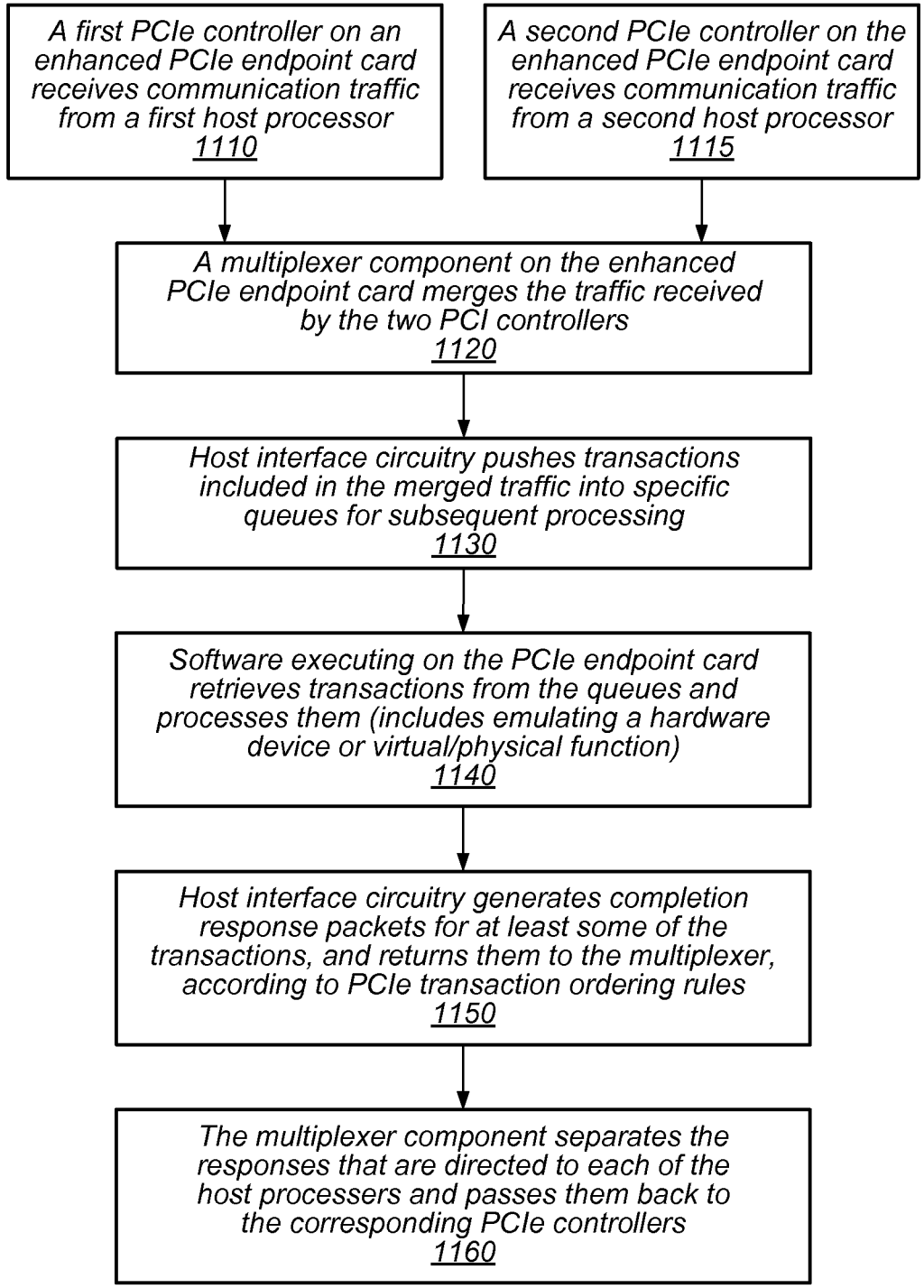
FIG. 11 illustrates handling communication traffic on an endpoint device, according to some embodiments.

FIG. 11 illustrates handling communication traffic on an endpoint device, according to some embodiments. The handling can be at least partially implemented by one or more computer systems, described further below.

In some embodiments, an endpoint device may be implemented as single physical device (e.g., a single PCIe card) that is logically or functionally equivalent to multiple PCIe controllers. For example, the endpoint device, which can include an enhanced PCIe endpoint device, may manifest multiple independent PCIe controllers, and various hardware and/or software components may be configured to multiplex the PCIe traffic in order for system software or client applications (or various threads or other software processes thereof) to be able to operate across multiple PCIe controllers. In some embodiments, the multiple PCIe controllers do not share physical PCIe communication lanes when communicating with the communicatively coupled processor devices. Instead, there may be separate and independent sets of serial channels, where a set of serial channels can include a PCIe channel which includes a set of PCIe lanes, established between each of the different independent PCIe controllers and the processor device serial links to which they are coupled via an individual serial link interface of the motherboard.

One embodiment of a method for handling communication traffic (e.g., PCIe traffic) on an endpoint device which comprises an enhanced PCIe endpoint device that presents multiple PCIe endpoints is illustrated by the flow diagram in FIG. 11. As illustrated at 1110 and 1115, in this example, the method may include a first PCIe controller on an enhanced PCIe endpoint device receiving communication traffic from a first host processor and a second PCIe controller on the enhanced PCIe endpoint device receiving communication traffic from a second host processor. For example, PCIe controllers on the enhanced PCIe endpoint device may receive transaction layer packets from each of the processor devices communicatively coupled to the endpoint device via symmetrical serial links that include transactions directed to emulated hardware devices or virtual/physical functions thereof.

As illustrated in this example, the method may include a multiplexer component on the enhanced PCIe endpoint device (e.g., a hardware circuit that implements a multiplexing function, or a multiplexer component implemented in software or using a combination of hardware and software) merging the traffic received by the two PCI controllers, as in 1120. In some embodiments, the multiplexer component may be configured to merge incoming traffic on the enhanced PCIe endpoint device and to separate outgoing traffic that is directed back to the processor devices through the PCIe controllers. The method may also include host interface circuitry on the enhanced PCIe endpoint device pushing transactions that were included in the merged traffic into specific queues for subsequent processing, as in 1130. For example, the transactions may be pushed into particular ones of multiple transaction ring buffers that are instantiated in memory on the enhanced PCIe endpoint device, where the particular ring buffers into which each transaction is pushed may be dependent on a software-definable mapping of various transaction-related parameter values (e.g., tuples of addresses, routing identifiers and transaction classes, or other combinations of parameter values) to specific transaction ring buffers, as described herein.

As illustrated in FIG. 11, the method may include software executing on the enhanced PCIe endpoint device retrieving each of the transactions from the queues and processing it, which may include emulating a hardware device or virtual/physical function (as in 1140). As described herein, there may be some flexibility in the order in which transactions are processed on the enhanced PCIe endpoint device, based on the workload or on various scheduling polices. As illustrated in this example, the method may include host interface circuitry (e.g., a response processor component of a host interface module) generating completion response packets for at least some of the transactions, and returning them to the multiplexer component, according to PCIe transaction ordering rules (as in 1150). The method may also include the multiplexer component separating the responses that are directed to each of the host processors and passing them back to the corresponding PCIe controllers, from which they may be returned to the communicatively coupled processor devices (as in 1160). The responses can be returned to the processor devices via the symmetrical sets of serial links between the endpoint device and the processor devices, such that the separate responses, transmitted simultaneously to the separate processor devices, are received simultaneously at the separate processor devices.

Note that in embodiments in which there are multiple host interface circuitry components that precede a single multiplexer component on the enhanced PCIe endpoint card, the operations shown in elements 1120 and 1130 in FIG. 11 and the operations shown in elements 1150 and 1160 in FIG. 11 may be reversed. For example, in response to a first PCIe controller on an enhanced PCIe endpoint device receiving communication traffic from a first processor device, the first PCIe controller may route that communication traffic (as transaction layer packets) to a first host interface circuit component for processing, and the first host interface circuit component may then pass the resulting communication traffic (as transaction layer packets) to the multiplexer component. Meanwhile, in response to a second PCIe controller on the enhanced PCIe endpoint device receiving communication traffic from a second processor device, the second PCIe controller may route that communication traffic (as transaction layer packets) to a second host interface circuit component for processing, and the second host interface circuit component may then pass the resulting communication traffic (as transaction layer packets) to the multiplexer component. Communication traffic from the two host interface circuitry components to the endpoint memory may then be merged by the single multiplexer component before being communicated to the endpoint memory. Communication traffic from the first and second processor devices can be received simultaneously, as the first and second processor devices can be communicatively coupled to the endpoint device via symmetrical serial links. Subsequent to the received transactions being processed (as in 1140), the multiplexer component may separate any communication returned from the processing of the transactions and direct it to the host interface circuitry component that is coupled to the PCIe controller through which the corresponding transaction was received from one of the processer devices. Each of the host interface circuitry components (e.g., or response processor components) may generate completion response packets for at least some of the transactions, and return them to the corresponding PCIe controllers, according to PCIe transaction ordering rules, from which they may be returned to the processor devices.

In some embodiments, communication traffic exchanged between the endpoint device and multiple communicatively coupled processor devices passes through an individual serial link interface of the motherboard to which the processor devices are coupled. In various embodiments, either third generation PCIe interfaces (e.g., PCIe Gen3 x4, x8, or x16 interfaces) or Ethernet interfaces (e.g., 10 or 25 Gb interfaces) may be used as the serial link interface on the motherboard for communication traffic.

Figure 12:
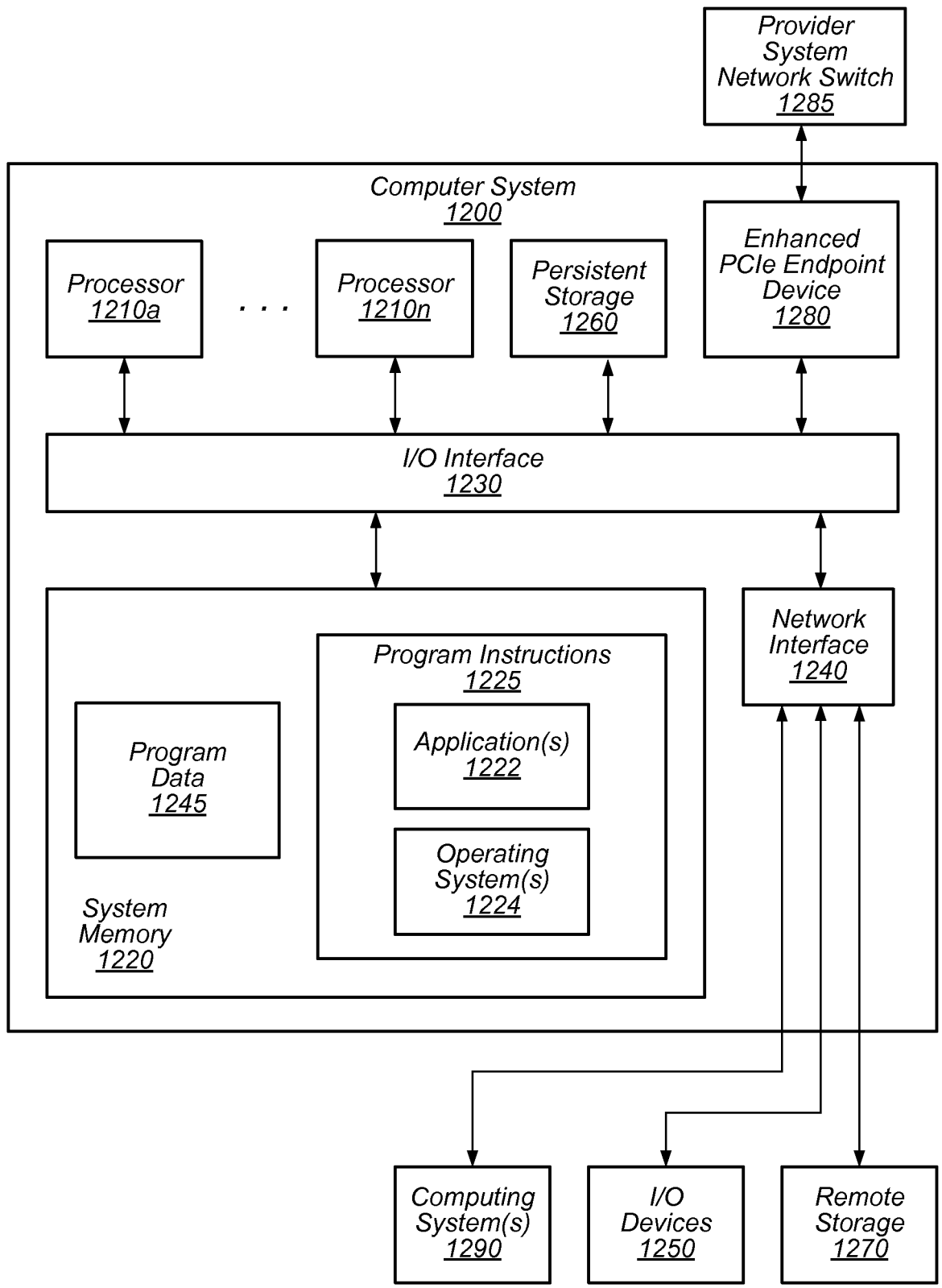
FIG. 12 is a block diagram illustrating a computer system configured to implement the techniques described herein, according to various embodiments.

The methods described herein may in various embodiments be implemented by any combination of hardware and/or software. For example, in one embodiment, the methods may be implemented by one or more computer systems, each of which includes a processor executing program instructions stored on a computer-readable storage medium coupled to the processor. The program instructions may be configured to implement at least some of the functionality described herein for using an endpoint device, which can include an enhanced PCIe endpoint device, to accelerate the emulation of PCIe compliant hardware devices (and/or to reduce latency and jitter for PCIe traffic) and to present one or multiple PCIe endpoints to one or more host processors to provide access to those emulated devices (or to various virtual/physical functions thereof). FIG. 12 is a block diagram illustrating a computer system configured to implement at least a portion of the techniques described herein, according to various embodiments. Computer system 1200 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device. Note that computer system 1200 may, in various embodiments, be a stand-alone system that provides shared memory for multiple concurrently executing processes and/or applications, a single one of multiple identical or similar computing nodes in a distributed system, or a single computing node in a provider network that provides virtualized storage and/or computing services to clients, as described herein. In some embodiments, computer system 1200 include an enhanced PCIe endpoint device on which any number of PCIe compliant hardware devices are emulated on behalf of virtualized computing service clients.

Computer system 1200 includes one or more processors 1210 (any of which may include multiple cores, which may be single or multi-threaded) coupled to a system memory 1220 via an input/output (I/O) interface 1230. Computer system 1200 further includes a network interface 1240 coupled to I/O interface 1230. In various embodiments, computer system 1200 may be a uniprocessor system including one processor 1210, or a multiprocessor system including several processors 1210 (e.g., two, four, eight, or another suitable number). Processors 1210 may be any suitable processors capable of executing instructions. For example, in various embodiments, processors 1210 may be general-purpose, special-purpose, or embedded processors implementing any of a variety of instruction set architectures (ISAs), such as the x86, PowerPC, SPARC, or MIPS ISAs, or any other suitable ISA. In multiprocessor systems, each of processors 1210 may commonly, but not necessarily, implement the same ISA. The computer system 1200 also includes one or more network communication devices (e.g., network interface 1240) for communicating with other systems and/or components over a communications network (e.g. Internet, LAN, etc.). For example, a client application executing on system 1200 may use network interface 1240 to communicate with a server application executing on a single server or on a cluster of servers that implement a distributed system. In another example, an instance of a server application executing on computer system 1200 may use network interface 1240 to communicate with a client application and/or with other instances of the server application that may be implemented on other computer systems.

In the illustrated embodiment, computer system 1200 also includes one or more persistent storage devices 1260. In various embodiments, persistent storage devices 1260 may correspond to disk drives, tape drives, solid state memory, other mass storage devices, or any other persistent storage device. Computer system 1200 (or an application, software component, or operating system operating thereon) may store instructions and/or data in persistent storage devices 1260, as desired, and may retrieve the stored instruction and/or data as needed. Computer system 1200 also includes enhanced PCIe endpoint device 1280, which can include any of the endpoint devices illustrated in any of FIG. 1-11. For example, enhanced PCIe endpoint device 1280 may include may include an endpoint SOC, which includes a network interface, one or more PCIe endpoint controllers, an emulation processor, host interface circuitry, a multiplexer component, a request processor, host interface steering logic, a response processor, multiple transaction ring buffer CSRs and transaction ring buffer pointers, endpoint memory, which may store emulation code and/or include multiple transaction ring buffers, an SOC memory, which may include (instantiated within the SOC memory) multiple transaction ring buffers, and/or any other circuitry suitable to support using an enhanced PCIe endpoint to accelerate the emulation of PCIe compliant hardware devices (and/or to reduce latency and jitter for PCIe traffic) and to present one or more PCIe endpoints to a host processor, as described herein.

As illustrated in FIG. 12, a network interface of enhanced PCIe endpoint device 1280 may communicate with other networks and/or networked devices through provider system network switch 1285. For example, in some embodiments, provider system network switch 1285 may serve to connect the enhanced PCIe endpoint device 1280 (or a network interface thereof) to other networks (e.g., to the public Internet or to an intermediate network) and/or to other networked devices in a provider's data center (e.g., to the next level data center routers that, eventually, connect together all of the other servers, or racks thereof, in the data center).

Computer system 1200 includes one or more system memories 1220 that are configured to store instructions and data accessible by one or more processors 1210*a-n*. In various embodiments, system memories 1220 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1220 may contain program instructions 1225 that are executable by processor(s) 1210*a-n* to implement at least a portion of the methods and techniques described herein for using an enhanced PCIe endpoint to accelerate the emulation of PCIe compliant hardware devices and/or to reduce latency and jitter for PCIe traffic. In various embodiments, program instructions 1225 (and/or program instructions within any emulation code stored in memory on enhanced PCIe endpoint device 1280) may be encoded in platform native binary, any interpreted language such as Java™ byte-code, or in any other language such as C/C++, Java™, etc., or in any combination thereof. For example, in the illustrated embodiment, program instructions 1225 include program instructions executable to implement one or more application(s) 1222 (which may include various configuration modules, not shown), and/or operating system(s) 1224, which may include or be implemented as a hypervisor or virtual machine monitor, or any of various operating systems, such as UNIX, LINUX, Solaris™, MacOS™, Windows™, etc.

Note that in various embodiments, some or all of system memory 1210 (including some or all of program instructions 1225, and/or program data 1245) may be implemented within shared physical memory pages in a stand-alone computer system or in a system that provides virtualized resources to clients, as described herein.

Any or all of program instructions 1225, including application(s) 1222, configuration module(s), emulation code stored in memory on enhanced PCIe endpoint device 1280, and/or operating system(s) 1224, may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1200 via I/O interface 1230. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1200 as system memory 1220 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1240.

In some embodiments, system memory 1220 may include storage for program data 1245. In various embodiments, system memory 1220 (e.g., program data 1245 within system memory 1220) and/or remote storage 1270 may store various configuration parameter values or other information usable in implementing the methods and techniques described herein.

In one embodiment, I/O interface 1230 may be configured to coordinate I/O traffic between processor 1210, system memory 1220 and any peripheral devices in the system, including through network interface 1240 or other peripheral interfaces. In some embodiments, I/O interface 1230 may perform any necessary protocol, timing or other data transformations to convert data signals from one component (e.g., system memory 1220) into a format suitable for use by another component (e.g., processor 1210). In various embodiments, I/O interface 1230 may include support for devices attached through one or more types of peripheral buses, such as a variant of the Peripheral Component Interconnect (PCI) bus standard, the Peripheral Component Interconnect Express (PCIe) bus standard, or the Universal Serial Bus (USB) standard, for example. In some embodiments, the function of I/O interface 1230 may be split into two or more separate components, such as a north bridge and a south bridge, for example. Also, in some embodiments, some or all of the functionality of I/O interface 1230, such as an interface to system memory 1220, may be incorporated directly into processor 1210.

Network interface 1240 may be configured to allow data to be exchanged between computer system 1200 and other devices attached to a network, such as other computer systems 1290 (which may implement one or more server nodes and/or clients of a distributed system, such as a host server or host processor thereof), for example. In addition, network interface 1240 may be configured to allow communication between computer system 1200 and various I/O devices 1250 and/or remote storage 1270. Input/output devices 1250 may, in some embodiments, include one or more display terminals, keyboards, keypads, touchpads, scanning devices, voice or optical recognition devices, or any other devices suitable for entering or retrieving data by one or more computer systems 1200. Multiple input/output devices 1250 may be present in computer system 1200 or may be distributed on various nodes of a distributed system that includes computer system 1200. In some embodiments, similar input/output devices may be separate from computer system 1200 and may interact with one or more nodes of a distributed system that includes computer system 1200 through a wired or wireless connection, such as over network interface 1240. Network interface 1240 may commonly support one or more wireless networking protocols (e.g., Wi-Fi/IEEE 802.11, or another wireless networking standard). However, in various embodiments, network interface 1240 may support communication via any suitable wired or wireless general data networks, such as other types of Ethernet networks, for example. Additionally, network interface 1240 may support communication via telecommunications/telephony networks such as analog voice networks or digital fiber communications networks, via storage area networks such as Fibre Channel SANs, or via any other suitable type of network and/or protocol. In various embodiments, computer system 1200 may include more, fewer, or different components than those illustrated in FIG. 12 (e.g., displays, video cards, audio cards, peripheral devices, other network interfaces such as an ATM interface, an Ethernet interface, a Frame Relay interface, etc.)

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A computer system, comprising:
a motherboard which comprises:
a plurality of separate serial links;
a motherboard serial link interface;
a plurality of symmetrical sets of motherboard serial channels, wherein each separate symmetrical set of motherboard serial channels communicatively couples a separate serial link, of the plurality of separate serial links, with the motherboard serial link interface, such that the motherboard serial link interface is communicatively and symmetrically coupled with each of the plurality of separate serial links via the plurality of symmetrical sets of motherboard serial channels; and
a plurality of processor devices, each coupled to a respective one of the plurality of separate serial links, such that the motherboard serial link interface is communicatively and symmetrically coupled with each of the plurality of processor devices via the plurality of symmetrical sets of motherboard serial channels and the plurality of separate serial links; and an endpoint device configured to provide a plurality of emulated Peripheral Component Interconnect Express (PCIe) endpoint controllers accessible using respective separate sets of nonshared endpoint serial channels; and
an expansion card which comprises:
an expansion serial link interface configured to couple with the motherboard serial link interface, such that the expansion serial link interface communicatively couples with at least symmetrical limited selections of motherboard serial channels of each of the separate symmetrical sets of motherboard serial channels;
an endpoint device expansion slot configured to couple with the respective separate sets of nonshared endpoint serial channels of the plurality of emulated endpoint controllers of the endpoint device; and
a set of symmetrical expansion serial channels which communicatively and symmetrically couple the symmetrical limited selections of motherboard serial channels with the endpoint device expansion slot, such that the endpoint device expansion slot is configured to communicatively and symmetrically couple respective different ones of the plurality of separate sets of nonshared endpoint serial channels of the endpoint device with respective ones of the processor devices of the motherboard via the symmetrical limited selections of motherboard serial channels and the set of symmetrical expansion card serial channels;
the expansion card configured to:
establish symmetrical serial links between respective ones of the plurality of separate sets of nonshared endpoint serial channels of the endpoint device and respective ones of the plurality of processor devices of the motherboard; and
enable simultaneous communication between the respective emulated endpoint controllers of the endpoint device and respective ones of the plurality of processor devices of the motherboard via the plurality of separate sets of nonshared endpoint serial channels of the endpoint device.

2. The computer system of claim 1, wherein the expansion card comprises:
at least one expansion device interface configured to communicatively couple with at least one expansion device; and
at least one set of expansion card serial channels which communicatively couples at least some of the motherboard serial channels, of each set of motherboard serial channels, with the at least one expansion device interface, such that the at least one expansion device interface is configured to communicatively couple the plurality of processor devices with the at least one expansion device.

3. The computer system of claim 1, wherein:
the motherboard is one of a plurality of motherboards, wherein: each separate motherboard comprises a separate plurality of processor devices and a separate motherboard serial link interface; and
the plurality of motherboards are configured to communicatively couple the respective pluralities of processor devices with separate expansion devices, via respective motherboard serial link interfaces.

4. The computer system of claim 1, wherein:
the computer system is configured to conform to a rack computer system frame configured to extend along a full width of a standardized rack computer system form factor and further configured to extend along a height of 1.5 rack units.

5. An apparatus, comprising:
an endpoint device comprising a plurality of emulated Peripheral Component Interconnect Express (PCIe) endpoint devices accessible using respective separate sets of nonshared endpoint serial channels; and
a motherboard configured to establish symmetrical serial links between each of a plurality of processor devices and the endpoint device providing the plurality of emulated PCIe endpoint devices via the respective separate sets of nonshared endpoint serial channels to enable simultaneous communication between the respective emulated PCIe endpoint devices of the endpoint device and each of the plurality of processor devices, wherein the motherboard comprises:
a plurality of serial links, wherein each separate serial link is configured to couple with a separate processor device of the plurality of processor devices; and
an individual motherboard serial link interface configured to communicatively couple with the separate sets of nonshared endpoint serial channels of the endpoint device via separate symmetrical sets of motherboard serial channels such that symmetrical serial links are established between respective different ones of the respective separate sets of nonshared endpoint serial channels of the endpoint device and respective ones of the plurality of processor devices of the motherboard via symmetrical limited selections of motherboard serial channels of the separate symmetrical sets of motherboard serial channels.

6. The apparatus of claim 5, wherein:
to communicatively couple with at least one serial link interface of the endpoint device, the individual motherboard serial link interface is configured to physically couple with at least one riser card which is configured to physically coupled with the endpoint device.

7. The apparatus of claim 6, wherein the at least one riser card comprises:
a riser serial link interface configured to couple with symmetrical limited selections of each set of motherboard serial channels via coupling with the motherboard serial link interface; and an endpoint device interface configured to physically couple with the endpoint device, wherein: the endpoint device interface is communicatively coupled to the at least one riser serial link interface via a plurality of symmetrical sets of riser serial channels, and each separate set of riser serial channels is configured to be communicatively coupled, via the riser serial link interface, to a separate limited selection of motherboard serial channels.

8. The apparatus of claim 7, wherein the at least one riser card comprises:
an expansion device interface configured to communicatively couple the processor devices with an expansion device; and
a set of expansion card serial channels which communicatively couple at least some of the motherboard serial channels, of each set of motherboard serial channels, with the expansion device interface via the riser serial link interface.

9. The apparatus of claim 8, wherein the expansion device comprises at least one of:
a solid state data storage device; or
a network communication device.

10. The apparatus of claim 8, wherein the at least one riser card comprises:
at least one set of riser serial channels which are configured to communicatively couple at least two separate device interfaces included on the at least one riser card, such that the at least one riser card is configured to communicatively couple separate devices coupled to the at least two separate device interfaces, independently of the motherboard;
wherein the at least two separate device interfaces comprise at least one of the endpoint device interface or the expansion device interface.

11. The apparatus of claim 5, comprising:
a plurality of motherboards, where each separate motherboard, of the plurality of motherboards, is configured to establish symmetrical serial links between a separate plurality of processor devices and a separate endpoint device.

12. The apparatus of claim 11, wherein, to establish symmetrical serial links between a separate plurality of processor devices and a separate endpoint device, each separate motherboard comprises a separate individual motherboard serial link interface which is configured to physically couple with a separate riser card such that the separate riser card extends orthogonally from the respective separate motherboard.

13. The apparatus of claim 5, wherein:
each serial link of the plurality of serial links comprises a separate Peripheral Component Interconnect Express (PCIe) serial link;
the individual motherboard serial link interface comprises a PCIe expansion slot which is configured to couple with at least one PCIe connector;
each symmetrical set of motherboard serial channels comprises a set of PCIe lanes; and the endpoint device comprises an enhanced PCIe endpoint device which is configured to: emulate one or more hardware devices that are compliant with a PCIe standard, merge communication traffic, received from the plurality of processor devices, that is directed to at least one emulated hardware device of the one or more hardware devices, and
process the merged communication traffic, wherein to process the merged communication traffic, the enhanced PCIe endpoint device is configured to emulate the at least one of the one or more emulated hardware devices to which the merged communication traffic is directed.

14. A method, comprising:
configuring a computer system to enable simultaneous communication between each of a plurality of processor devices attached to a motherboard and an endpoint device providing a plurality of emulated Peripheral Component Interconnect Express (PCIe) endpoint devices accessible using respective separate sets of nonshared endpoint serial channels, wherein the configuring comprises:
coupling each of the plurality of processor devices to respective serial links of a plurality of serial links on the motherboard, wherein the motherboard comprises an individual motherboard serial link interface and a plurality of symmetrical sets of motherboard serial channels coupling at least a portion of the motherboard serial link interface to each respective serial link of the plurality of serial links, such that the coupled plurality of processor devices are each communicatively coupled to the motherboard serial link interface via the plurality of symmetrical sets of motherboard serial channels; and
communicatively coupling the endpoint device to the motherboard serial link interface, such that a serial link is established between each processor device of the plurality of processor devices of the motherboard and a respective emulated PCIe endpoint device of the emulated PCIe endpoint devices via respective different ones of the separate sets of nonshared endpoint serial channels, each corresponding to a different one of the respective emulated PCIe endpoint devices of the endpoint device, at least the motherboard serial link interface and symmetrical limited selections of the plurality of symmetrical sets of motherboard serial channels.

15. The method of claim 14, wherein:
communicatively coupling the endpoint device to the motherboard serial link interface comprises physically coupling at least one riser card with the individual motherboard serial link interface, wherein the at least one riser card is configured to physically couple with the endpoint device, such that physically coupling the endpoint device with the at least one riser card communicatively couples the endpoint device with the plurality of processor devices.

16. The method of claim 15, wherein the riser card comprises:
at least one riser serial link interface configured to physically couple with the individual motherboard serial link interface, such that the at least one riser serial link interface communicatively couples with at least a plurality of limited selections of motherboard serial channels, wherein each separate limited selection of motherboard serial channels comprises a limited selection of a separate symmetrical set of motherboard serial channels; and
an endpoint device interface configured to physically couple with the endpoint device, wherein: the endpoint device interface is communicatively coupled to the at least one riser serial link interface via a plurality of symmetrical sets of riser serial channels, and
each separate symmetrical set of riser serial channels is configured to be communicatively coupled, via the at least one riser serial link interface to a separate limited selection of motherboard serial channels, of the plurality of limited selections of motherboard serial channels.

17. The method of claim 15, wherein:
the riser card is configured to physically couple with both the endpoint device and at least one expansion device, such that the plurality of processor devices are communicatively coupled with both the endpoint device and the at least one expansion device.

18. The method of claim 17, wherein:
the riser card is configured to communicatively couple at least two separate devices which are separately coupled to at least two separate device interfaces on the riser card, independently of the motherboard.

19. The method of claim 15, wherein the configuring comprises:
coupling separate pluralities of processor devices to corresponding serial links on corresponding separate motherboards in the computer system, wherein each separate motherboard comprises a separate individual motherboard serial link interface and a separate plurality of symmetrical sets of motherboard serial channels; and
communicatively coupling each endpoint device, of a plurality of endpoint devices, to a separate motherboard serial link interface of a separate motherboard, such that the plurality of endpoint devices are communicatively coupled to separate pluralities of processor devices which are coupled to serial links on separate motherboards.

20. The method of claim 14, wherein:
each serial link comprises a separate Peripheral Component Interconnect Express (PCIe) serial link;
the motherboard serial link interface comprises a PCIe expansion slot which is configured to couple with at least one PCIe connector;
each symmetrical set of motherboard serial channels comprises a set of PCIe serial lanes; and
the endpoint device comprises an enhanced PCIe endpoint device which is configured to: emulate one or more hardware devices that are compliant with a PCIe standard, merge communication traffic, received from the plurality of processor devices, that is directed to at least one emulated hardware device of the one or more hardware devices, and process the merged communication traffic, wherein to process the merged communication traffic, the enhanced PCIe endpoint device is configured to emulate the at least one of the one or more emulated hardware devices to which the merged communication traffic is directed.

* * * * *